US012784052B2

(12) United States Patent
Costa et al.

(10) Patent No.: US 12,784,052 B2
(45) Date of Patent: Nov. 3, 2026

(54) ALERT REVIEW USING MACHINE LEARNING AND INTERACTIVE VISUALIZATIONS

(71) Applicant: Feedzai—Consultadoria e Inovação Tecnológica, S.A., Coimbra (PT)

(72) Inventors: Rita Marques Costa, Lisbon (PT); Mário João Cabral Cardoso, Lisbon (PT); Pedro dos Santos Saleiro, Lisbon (PT); Pedro Gustavo Santos Rodrigues Bizarro, Lisbon (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 1026 days.

(21) Appl. No.: 17/891,976

(22) Filed: Aug. 19, 2022

(65) Prior Publication Data

US 2023/0351392 A1 Nov. 2, 2023

Related U.S. Application Data

(60) Provisional application No. 63/336,494, filed on Apr. 29, 2022.

(51) Int. Cl.
*G06Q 20/40* (2012.01)
*G06N 5/022* (2023.01)

(52) U.S. Cl.
CPC ......... *G06Q 20/4016* (2013.01); *G06N 5/022* (2013.01)

(58) Field of Classification Search
CPC .... G06Q 20/4016; G06N 5/022; G06N 3/044; G06N 3/0895; G06N 5/045; G06N 5/046; G06N 3/042
See application file for complete search history.

(56) References Cited

U.S. PATENT DOCUMENTS

| | | | | |
|---|---|---|---|---|
| 11,216,762 | B1 * | 1/2022 | Maass | G06Q 20/10 |
| 2018/0316695 | A1 * | 11/2018 | Esman | G06Q 20/4016 |
| 2020/0118136 | A1 * | 4/2020 | Zhang | G06Q 20/405 |

OTHER PUBLICATIONS

Babaev, Event sequence metric learning, pp. 1-9, Feb. 19, 2020.*
Sleeper, How to Make a Tableau Timeline when Events Overlap, pp. 1-14 (Year: 2021).*
Igor, Highlighting incoming/outgoing amounts in the balance sheet, pp. (Year: 2013).*
Fang, Highlight Critical Insights with Conditional Formatting in Amazon QuickSight, pp. 1-16, Nov. 25, 2019.*

* cited by examiner

*Primary Examiner* — Albert M Phillips, III
(74) *Attorney, Agent, or Firm* — Van Pelt, Yi & James LLP

(57) ABSTRACT

In various embodiments, a process for alert review using machine learning and interactive visualizations includes receiving transaction data for transactions, using a machine learning model to determine embedding representations of the transaction data, and using one or more automated rules to identify of a subset of the transactions. The process includes using at least a portion of the embedding representations to automatically cluster the identified subset of the transactions into a plurality of different cluster groups, and providing an interactive visual representation of the plurality of different cluster groups.

18 Claims, 17 Drawing Sheets

ALERT REVIEW USING MACHINE LEARNING AND INTERACTIVE VISUALIZATIONS

CROSS REFERENCE TO OTHER APPLICATIONS

This application claims priority to U.S. Provisional Patent Application No. 63/336,494 entitled ALERT REVIEW USING GRAPH MACHINE LEARNING filed Apr. 29, 2022 which is incorporated herein by reference for all purposes.

BACKGROUND OF THE INVENTION

Machine learning is being increasingly used in regulatory settings. For example, machine learning can be used to help detect security issues such as money laundering. Typically, a regulatory body defines a set of rules. When one or more transactions/events triggers one or more of the rules, an alert is generated. Human analysts then review the alerts, which can be a cumbersome and challenging task, depending on the number of transactions and entities associated with each alert. Thus, there is a need for an improved tool for analysts to review alerts.

BRIEF DESCRIPTION OF THE DRAWINGS

Various embodiments of the invention are disclosed in the following detailed description and the accompanying drawings.

DETAILED DESCRIPTION

Figure 1:
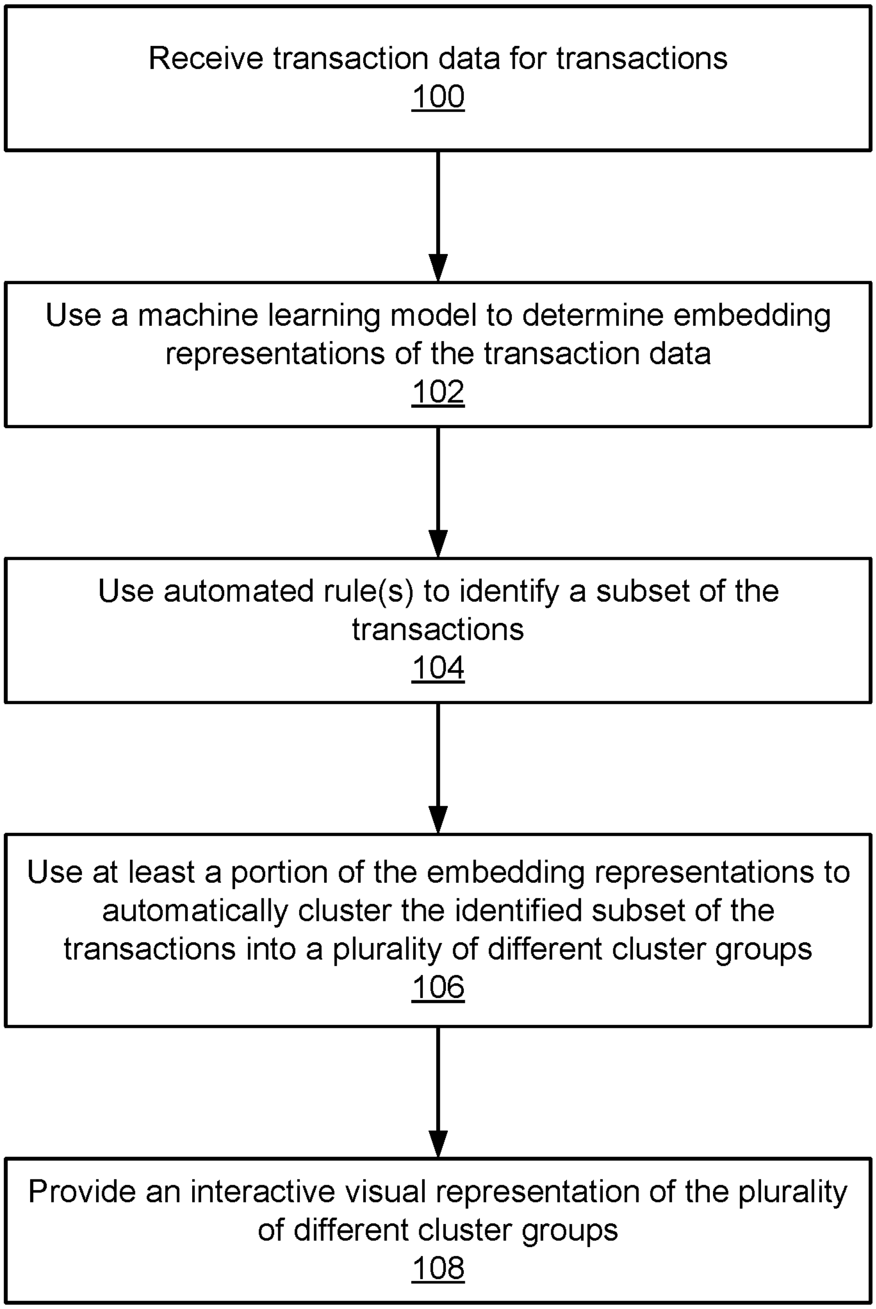
FIG. 1 is a flow diagram illustrating an embodiment of a process for alert review using machine learning.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The disclosed alert review and graph representation techniques are described using the example of money laundering, but this is merely exemplary and not intended to be limiting. The techniques may also be applied to other situations involving alert review and interactions that may be represented by a network or graph.

Money laundering is a criminal activity concerned with concealing the origin of funds obtained through illegal means such as terrorism financing, drug trafficking, corruption, or the like, appearing legitimate until a thorough analysis is performed. An estimated 2% to 5% of the global GDP is laundered annually. Financial institutions are required to comply with reporting guidelines to prevent money laundering. To adhere to the AML regulations, financial institutions employ compliance experts that investigate suspicious activities. Typically, a rule-based system generates an alert that an activity is suspicious. These triggered rules are the starting point of a process that can take several days to complete, culminating in a decision of flagging one or more activities as suspicious or not. Regulations typically require that when a suspicious activity is identified, a report is filed and delivered to a regulatory institution.

In Anti-Money Laundering (AML) reviewing, analysts investigate a bulk of transactions that triggered one or more alerts in order to understand if any suspicious activity was involved. An alert is typically centered on an entity (e.g., bank accounts or customers). Depending on the time granularity of the rules triggered and the characteristics of each customer, a large network of interactions is formed for each assessment. Navigating this network and keeping track of the flows of money, often through entities not directly connected to the customer being investigated, is challenging and cumbersome. For example, if a rule related to rapid movement of funds is triggered, the analyst would investigate the short term history (e.g., 14 days) of transactions from a given bank account.

To determine if the interactions are suspicious, the analyst typically takes into consideration the identity of the customer (referred to herein as "entity") under investigation, the various counterparts (referred to herein as "entities") that the customer interacted with, as well as all the transaction amounts and characteristics. Currently, analysts may try to understand the data through aggregations of meaningful categories, such as grouping by entities interacted with (referred to herein as "counterparts") or amounts, as well as relying on their past experience and prior knowledge of the customer under review.

Throughout the review process, there is a continuous effort to filter the large bulk of transactions into a smaller set of abnormal interactions that can be used to justify suspicious activity. There are some challenges with the current reviewing process. In one aspect, new analysts lack the context more experienced analysts might have, such as familiarity with re-occurring customers and the typical attributes and behavior (context) of new customers entering the system. In another aspect, it is challenging to navigate the bulk of transactions and deciding which movements are particularly suspicious. Resorting to a macro-view of the interactions can lead to missing the details of each transaction.

Conventionally, analysts use software for spreadsheet analysis, such as Excel® or Google Sheets®, to help with data aggregation. However, there are many disadvantages to using conventional tools including, but not limited to:

- Data is removed from its original context since this information is available in dedicated software along with other transactional and customer details. Thus, an analyst typically either ignores that context during analysis or constantly switches between two significantly different systems;
- To achieve certain aggregations and summary statistics, analysts need to repeatedly perform the same type of tasks for each new case they are reviewing;
- Typical spreadsheet analysis software is domain agnostic, making them blind to some of the most relevant variables for application such as money laundering, e.g., customer account, amount, or counterpart; and
- It is more difficult to assess which of the individual data points belong to which group and to compare them. The task becomes more difficult with the increase in the number of data points.

Reviewing alerts is a cumbersome and complex task that typically involves navigating a large network of (financial) transactions between entities to validate suspicious movements. A complex alert may take an analyst on the order of days to review. Complexity may be dictated by the number of transactions, entities involved and the degree of knowledge the analyst possesses about the customer, among other things. Furthermore, conventional rules systems have very high false positive rates (in some cases estimated to be over 95%). The scarcity of labels hinders the use of conventional systems based on supervised learning.

Techniques for alert review using machine learning are disclosed. The disclosed techniques find application in various domains including AML alert reviewing. In various embodiments, a user interface tailored for AML reviewing allows for the rearrangement of transaction data into user-defined groups. The efficiency of the investigation process is increased through a flexible interface adapted to an analyst's requirements, coupled with meaningful insights derived through machine learning techniques.

In various embodiments, the disclosed alert review system provides various insights to aid the review process and highlight relevant information. In various embodiments, low-dimensional representations are calculated for a plurality of types (e.g., both customers and transactions). The representations can be calculated without any specific supervision (i.e., through self-supervision), and can be used to derive the insights. The context surrounding an assessment may be important for determining how suspicious an activity is. This may involve investigating connections several "hops" away. According to embodiments of the present disclosure, a network of interactions is modeled by a heterogeneous graph, an example of which is a bipartite graph. The examples described herein sometimes refer to bipartite graphs, but the techniques may also be applied to heterogeneous graphs. The disclosed techniques may be applied to derive context-aware representations.

A user interface based on the representations may be initialized with default groups, at least some of which can be adapted depending on what the user selects from a series of predefined options (e.g., via a group by menu as further described herein). The interface also allows users to interact with single transactions. When transactions are selected, the chosen transactions are tracked via a counter. The interface helps a user (sometimes called an analyst) explore the multiple views of the data supported by the interface. The corresponding tabular data is available on demand. The system also offers additional insights, powered by context-aware machine learning techniques, to assist in the investigation process as further described herein.

Figure 2:
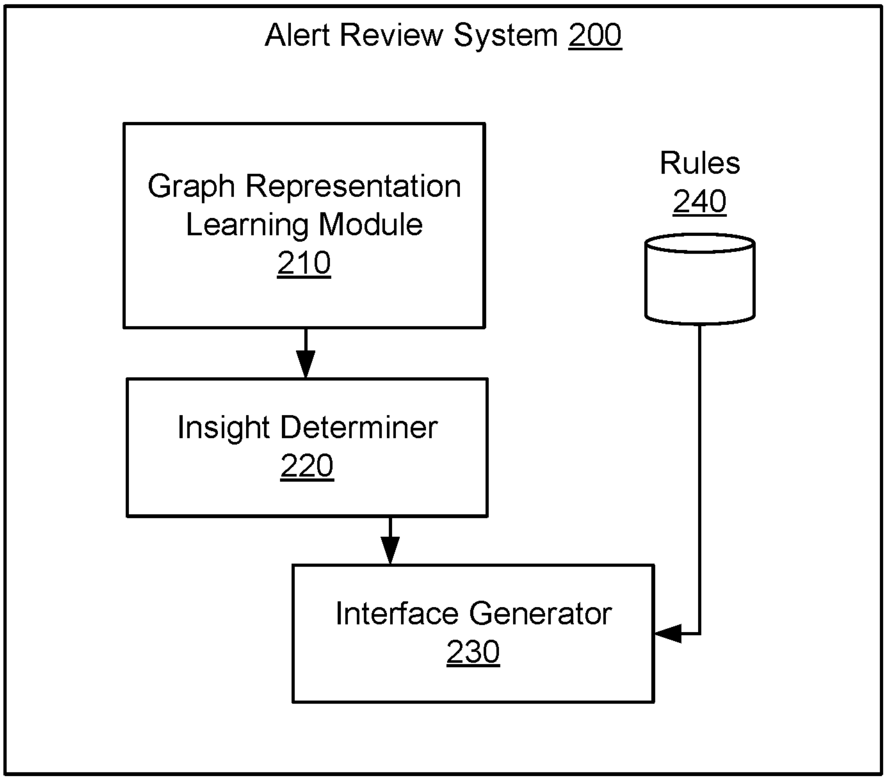
FIG. 2 is a block diagram illustrating an embodiment of a system for alert review using machine learning.

First, techniques for providing an alert review system are described (FIGS. 1 and 2). Next, techniques for self-supervised graph representation learning are described (FIGS. 3-10B). Then, some example user interfaces for an alert review system are described (FIGS. 11-14).

FIG. 1 is a flow diagram illustrating an embodiment of a process for alert review using machine learning. This process may be implemented on alert review system 200. The process creates a graph from collected transactions and customers information, uses a machine learning model to extract representations for the graph, and determines and displays insights from the representations as follows.

In the example shown, the process begins by receiving transaction data for transactions (100). Transaction data may include amounts and sources/destinations for the transaction such as counterparts, entities, customers, or the like. For example, when money is transferred between two customers, the transaction data includes the amount of the money transferred, the source customer, and the destination customer.

The process uses a machine learning model to determine embedding representations of the transaction data (102). In various embodiments, a graph is constructed using the transaction data. Graph representation learning is performed on the graph to generate embedding representations. An embedding is a representation of nodes in the graph. For example, where customers and transactions are nodes in a bipartite graph, the embedding is a representation for each customer node and transaction node. An embedding representation may be determined using a self-supervised graph representation learning process such as the one described with respect to FIG. 4.

The process uses one or more automated rules to identify a subset of the transactions (104). Rules may be defined according to specific needs. For example, for AML, rules may be set by regulatory bodies. A rule triggers when a transaction meets criteria set by the rule. For example, a law may require all cash transactions over $10,000 to be reported. A transaction over this amount would trigger a rule and cause the transaction to be identified as suspicious. In various embodiments, an alert is generated for an analyst to perform further review.

The process uses at least a portion of the embedding representations to automatically cluster the identified subset of the transactions into a plurality of different cluster groups (106). As further described herein, a cluster may be determined by applying a clustering algorithm on representations of a customer's transactions to determine per-customer transaction clustering. Other examples of clustering are described with respect to FIGS. 9, 10A, and 10B. In various embodiments, a portion of the embedding representations refers to using embedding representations of a subset of the transactions to determine clusters. For example, a subset of existing transactions (rather than all transactions) are clustered to reduce computational cost.

The process provides an interactive visual representation of the plurality of different cluster groups (108). The interactive visual representation may be presented on a user interface to assist analysts with the review process. In various embodiments, the user interface helps the analysts focus on the important tasks at hand by presenting aggregations and summary statistics about transactions. The user interface may be helpful to detect patterns and individual transactions that would otherwise be missed in conventional analysis. Some example visual representations are shown in FIGS. 11-14.

In various embodiments, the interactive visual representation may include insights such as: per-transaction anomaly score, per-customer behavior over time, and explanations regarding the model reasoning. With these insights, the customer under investigation can be quickly contextualized, while potentially relevant information is also highlighted.

In other words, representations can be used to enrich the visualizations insights. By way of non-limiting example, insights include one or more of the following:

Per-transaction anomaly score. For example, the score is 1—the output of the anomaly module.

Per-customer transaction clustering. For example, the clustering is determined by applying a clustering algorithm (e.g., K-Means) on the representations of a customer's transactions.

Per-customer behavior over time. For example, the behavior over time is determined by comparing the customer representations produced at different snapshots. If the distance between representations of consecutive snapshots is above a previously-tuned threshold, then that period is considered a period of anomalous activity.

Explanations. For example, explanations are determined by applying GNN explainability approaches to explain the produced representations.

FIG. 2 is a block diagram illustrating an embodiment of a system for alert review using machine learning. System 200 includes a graph representation learning module 210, an insight determiner 220, and an interface generator 230. In various embodiments, the system 200 includes a rules store 240. The rules store 240 may be local, remote, or external to the system. The alert review system receives transactions as input and outputs analysis about the transactions. As further described herein, rules may be triggered by transactions that meet the criteria defined by the rules. When the rules are triggered, an alert is generated to flag the information for further analyst review. The review process may be performed via a user interface that also displays helpful information about the transactions and network of interactions. As further described herein, a user interface may show insights and a visual representation of data.

Graph representation learning module 210 is configured to transform transaction data (e.g., tabular data) into graph data and determine embedding representations (e.g., vectors) of the graph data. Insight determiner 220 is configured to determine one or more insights using the embedding representations generated by the graph representation learning module. The insights may be about the transactions and/or entities such as customer behavior over time. Interface generator 230 is configured to create a user interface based on the insights, transaction data, and/or one or more triggered rules.

In operation, the alert review system 200 receives transaction data for transactions. In the AML, context, the transaction data may include transaction information and entity (customer) information. The graph representation learning module 210 uses the transaction information to determine an embedding representation. The insight determiner 220 uses the embedding representation to determine one or more insights. The interface generator 230 renders a user interface to show insights and/or one or more triggered rules from rules store 240.

Figure 3:
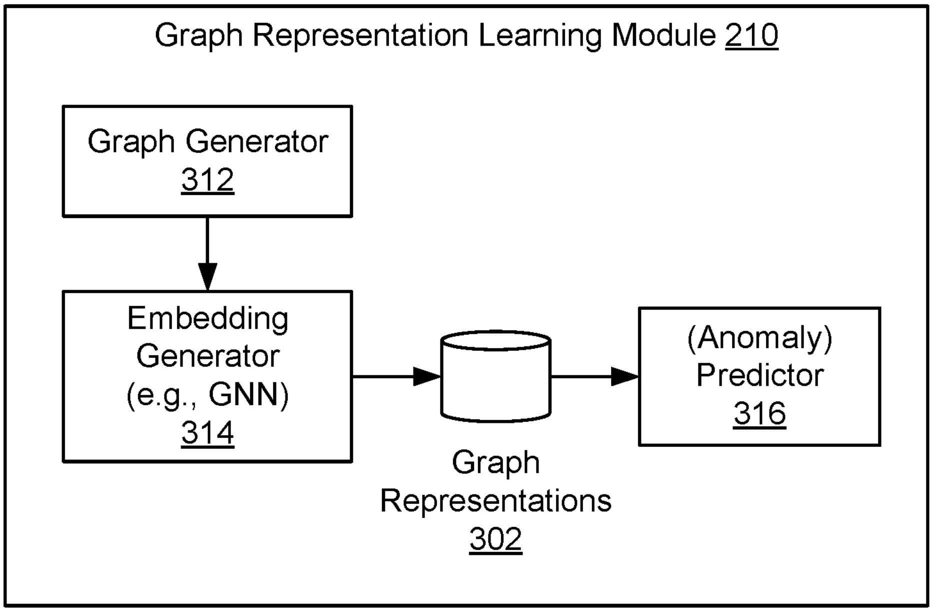
FIG. 3 is a block diagram illustrating an embodiment of a graph representation learning module.

FIG. 3 is a block diagram illustrating an embodiment of a graph representation learning module. The graph representation learning module is an example of a system for self-supervised graph representation learning. Graph representation learning module 210 can be included in another system as an alert review system, an example of which is shown in FIG. 2.

Graph representation learning module 210 includes graph generator 312, embedding generator 314, and predictor 316. Graph representations 302 determined by the embedding generator may be stored locally as shown or remotely.

Graph generator 312 is configured to create a graph, such as a heterogeneous graph, representing the transactions and/or related information. As further described herein, an example heterogeneous graph has two types of nodes, one to represent a transaction and one to represent a customer.

Predictor 316 is configured to make predictions about links including anomaly predictions. For example, the predictor determines an anomaly score for one or more transactions based on determined embedding representations. In various embodiments, the anomaly predictor is implemented by a differentiable model such as a multilayer perceptron (MLP).

In operation, the graph representation learning module receives a transaction. To determine transaction clusters, the graph generator 312 creates a graph (or inserts the transaction into a graph). The embedding generator 314 determines an embedding representation. As further described herein, a GNN may be trained to determine the embedding representations of every node in the graph. Referring again to the example of AML, the embedding generator determines a transaction representation, which may then be used to determine transaction clustering. The transaction clustering may be used by an alert review system such as the one shown in FIG. 2, for example visually displaying the information in a user interface.

In various embodiments, the embedding representations may be used to determine anomalies. To determine an anomaly (e.g., produce an anomaly score), the anomaly predictor module retrieves representations from graph representations store 302. Using the example of AML, the anomaly predictor 316 receives the embedding for a source customer (who is under review) and the embedding for a transaction and outputs the likelihood of an edge existing between the customer and the transaction.

Figure 4:
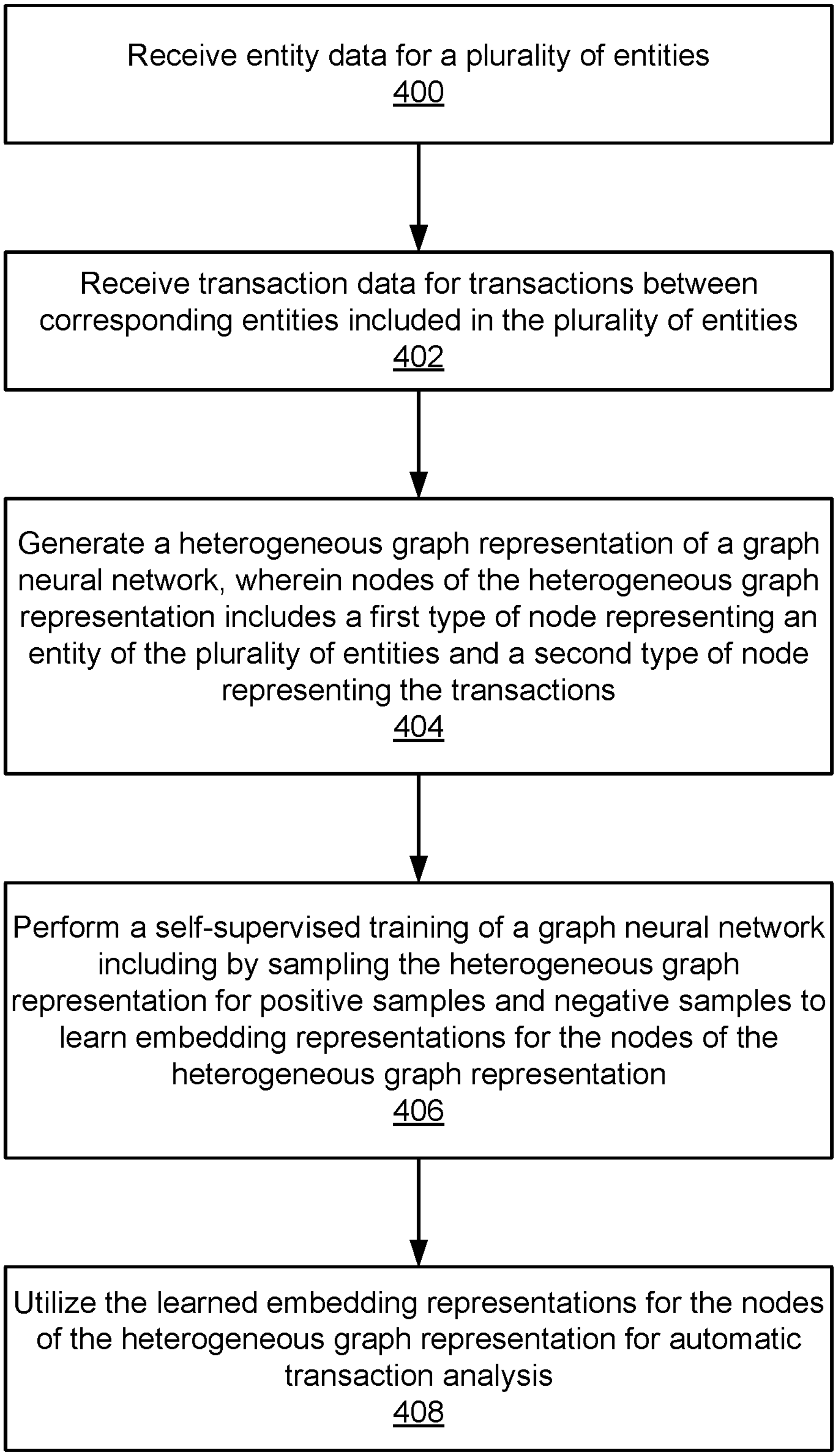
FIG. 4 is a flow diagram illustrating an embodiment of a process for self-supervised graph representation learning.

FIG. 4 is a flow diagram illustrating an embodiment of a process for self-supervised graph representation learning. This process may be implemented on graph representation learning module 210. This process may be performed as part of another process such as 102 of FIG. 1.

This process for self-supervised graph representation learning finds application in a variety of settings. For example, the graph representation can be used to encode banking customers and financial transactions into meaningful representations. These representations may be used to provide insights to assist the AML, reviewing process, such as identifying anomalous movements for a given customer. In various embodiments, an underlying network of interactions is represented as a customer-transaction bipartite graph and a GNN is trained on a fully self-supervised link prediction task.

In the example shown, the process begins by receiving entity data for a plurality of entities (400). The entity data may be provided/included in received transaction data (as described with respect to 402) or calculated based on past transactions. Examples of entity data that arrives with transactions include: the country associated with activity, a pre-computed measure of risk, and other features characterizing the customer within an organization (e.g., bank). Entity data calculated based on past transactions are referred to as profiles, which are features characterizing past behavior such as counts/sums of transactions at different time-granularities. In the context of AML for example, an entity is a customer, counterpart, account, or the like. Each entity may be uniquely identified by an identifier.

The process receives transaction data for transactions between corresponding entities included in the plurality of entities (402). Transaction data refers to information associated with a transaction such as a unique identifier, an amount, a time or time range when the transaction occurred, bank information (e.g., country) for senders and/or receivers, information about the payment such as device information, etc. In the context of AML for example, a transaction is a transfer of funds from a first set of one or more entities (customers) to a second set of one or more entities (customers). Transaction data includes features related to AML rules. In various embodiments, the entity data received at 400 may be included in the transaction data 402.

Figure 5:
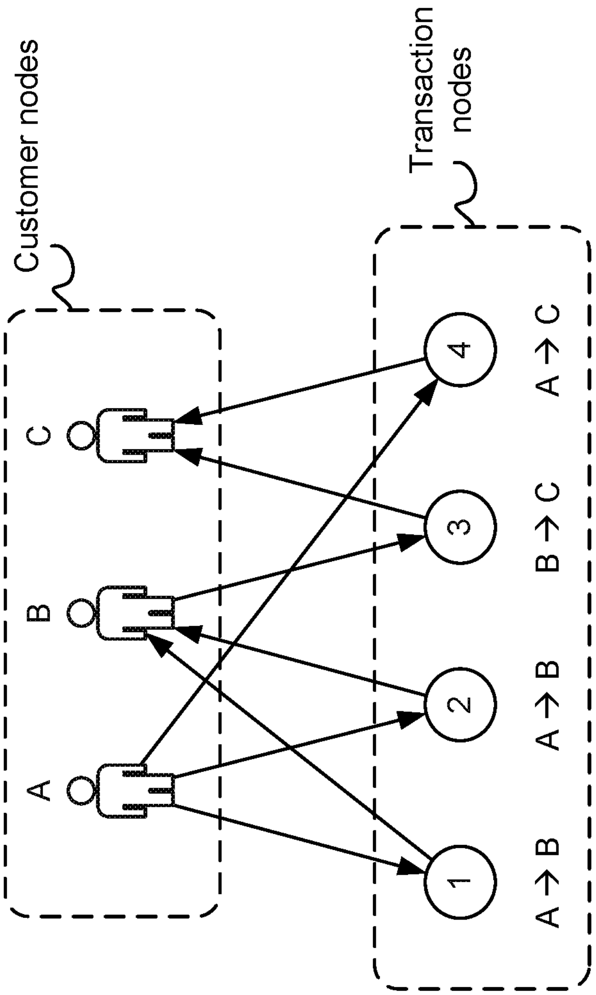
FIG. 5 is a diagram illustrating an example of a heterogeneous graph representation of a graph neural network obtained in some embodiments.

The process generates a heterogeneous graph representation of a graph neural network with nodes of the heterogeneous graph representation including a first type of nodes representing the entities and a second type of node representing the transactions (404). For example, the graph is a directed bipartite graph with two different node types: customer nodes and transaction nodes. Customer nodes are connected to transactions in which they are involved, and transactions are connected to their source and destination customers. As such, each transaction has two edges (one incoming and one outgoing), and each customer has as many edges as transactions performed in that time period. The flow of money is given by the direction of the edge, with outgoing transactions represented as an edge from a customer node to a transaction node, and incoming transactions represented as an edge from a transaction node to a customer node. An example of this graph is shown in FIG. 5. In one aspect, defining the graph in this manner provides a fine-grained view of the interactions between the different customers, which provides helpful context for use cases such as AML. In another aspect, the bipartite graph allows representations to be derived for both customers and transactions. In yet another aspect, the graph provides flexibility to extend with other entities and transactions with different characteristics.

The process performs a self-supervised training of the graph neural network including by sampling the heterogeneous graph representation for positive samples and negative samples to learn embedding representations for the nodes of the heterogeneous graph representation (406). There are various ways to train with self-supervised objectives such as using an edge prediction task, a transaction similarity task, a subgraph similarity task, among others.

To train using an edge prediction task, the model is provided with positive/negative examples of transactions that occurred/did not occur and trained to predict the probability of the transaction existing (e.g., through the anomaly predictor 316) and optimize with binary cross-entropy. The anomaly module receives as input a representation of the source customer (the customer under review) and a representation of the transaction.

To train using a transaction similarity task, the representation similarity between transactions with the same/different source customer is maximized/minimized. For example, determining a max-margin-based loss using the dot product between representations. The anomaly module is trained separately through binary cross-entropy, given the produced representations.

To train using a subgraph similarity task the representation similarity between the source customer and its pooled one-hop transaction subgraph is maximized/minimize. For example, determining a max-margin-based loss using the dot product between representations. The anomaly module is trained separately through binary cross-entropy, given the produced representations.

The process utilizes the learned embedding representations for the nodes of the heterogeneous graph representation for automatic transaction analysis (408). The embedding representations may correspond to insights or used to determine insights displayed in an alert review system such as the one shown in FIG. 2.

As further described herein, the embedding representations can be used to make a link prediction. In other words, the process predicts an anomaly based at least on the embedding representations.

FIG. 5 is a diagram illustrating an example of a heterogeneous graph representation of a graph neural network obtained in some embodiments. The heterogeneous graph representation (sometimes simply called "graph") includes nodes connected by edges. The graph is bipartite because it may have multiple types of nodes. In various embodiments, a directed bipartite graph G=(V, E) has V=C∪T denoting the set of customer (C) and transaction (T) nodes, and E=I∪O denoting the set of edges between them, where O represents outgoing transactions of the form C→T , and I represents incoming transactions of the form T→C. Each node type is associated with a feature vector $f_c \in R^{dc}$ and $f_t \in R^{dt}$, respectively representing the customer and transaction node feature vectors. Customer features, which are referred to herein as "profiles," characterize the customers' transactional behavior within time-windows of different granularities and other relevant attributes about the customer. Transaction features include information about the transaction itself. Customer nodes are connected to all transactions in which they are involved, and transaction nodes are connected to their source and destination customer. As such, each customer has as many edges as transactions performed in that time period and each transaction has two edges: one incoming and one outgoing.

In this example, the graph represents transactions between customers. There are two types of nodes: customer nodes and transactions nodes. In this example, they are visually differentiated with different symbols. For ease of references, each node is labeled with a letter (A, B, C) for customers or number (1, 2, 3, 4) for transactions. The edges are directed and the arrow indicates the direction of the transaction. For example, Transaction 1, is a transfer of funds from Customer A to Customer B and is represented by a pair of arrows, a first arrow from the node representing Customer A to the node representing Transaction 1 and a second arrow from the node representing Transaction 1 to the node representing Customer B. The other transactions (2, 3, and 4) are similarly represented.

This graph representation maintains the fine-grained nature of the interactions and flow of money, incorporates new transactions as they enter the system, and support information at both the customer and transaction level. One attractive way to represent financial interactions is to use a directed bipartite graph having customer and transaction nodes. The graph is created using raw data of past transactions performed within a fixed snapshot of time. In various embodiments, this graph dictates the representation of behavior of customers that will be learned, which is used as a reference point to score new transactions entering the system. After sufficient new data is accumulated, the model can be re-trained on a new graph to capture new behavioral patterns. A bipartite graph may be more suitable than a homogeneous multigraph for some types of data because it trivially allows for the learning of separate latent embedding spaces specific to each node type, which can be used directly or as building blocks to downstream tasks at the level of each node type. In addition, a bipartite graph provides the flexibility to include additional node types that may be relevant in the future, such as merchant nodes or card transaction nodes, with specific properties and features.

Figure 6:
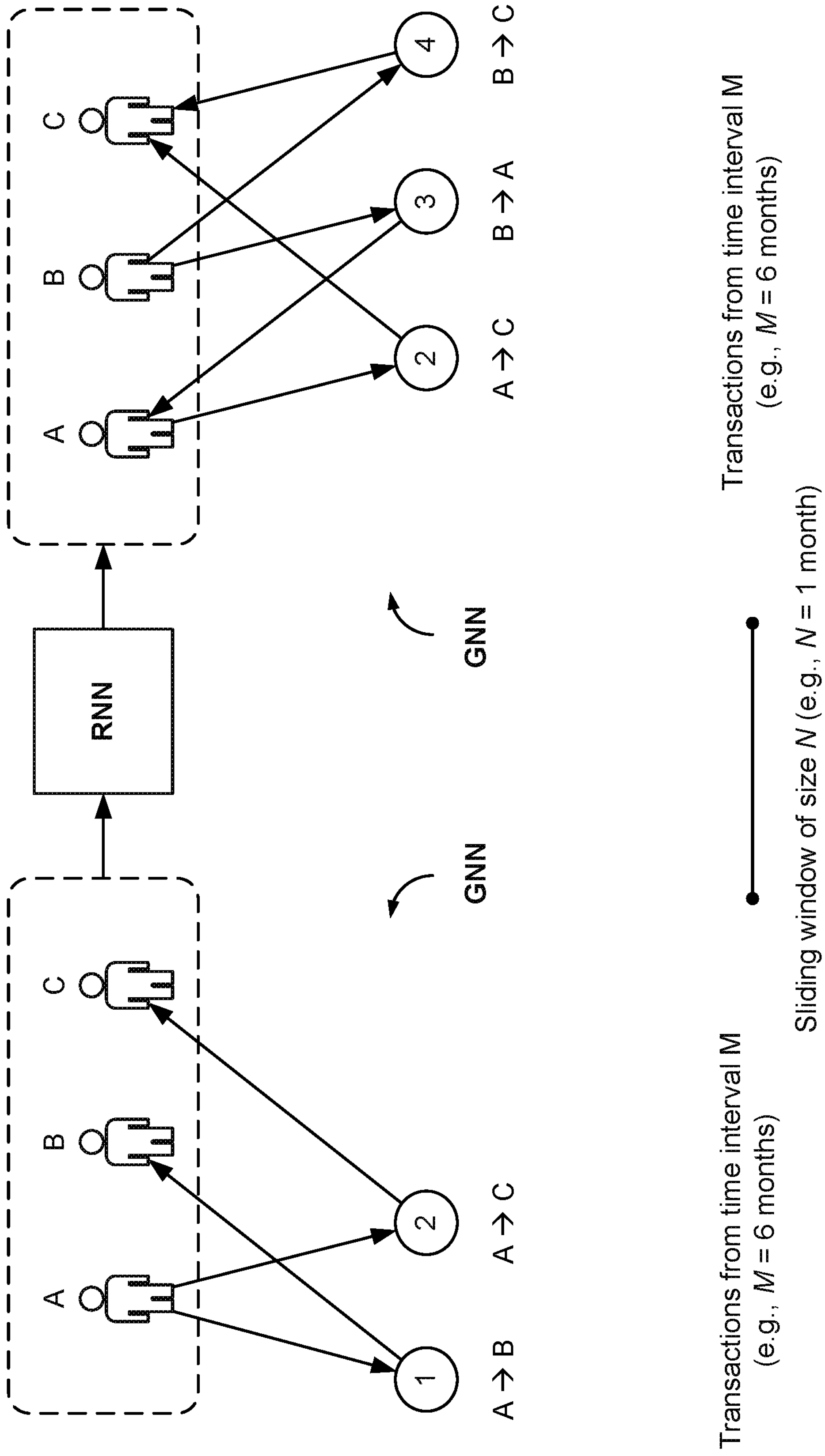
FIG. 6 is a diagram illustrating an example of heterogeneous graph representations applied to two snapshots obtained in some embodiments.

FIG. 6 is a diagram illustrating an example of heterogeneous graph representations applied to two snapshots obtained in some embodiments. As described herein, meaningful vector representations are derived for one or more nodes in the input graph that represent the behavior and characteristics of the source nodes. In various embodiments, a GNN is used to produce context-aware representations for each node. To avoid ever-growing graphs with arbitrarily old transactions, the GNN can be applied in discrete, fixed time intervals (or snapshots) parametrized by M, containing all transactions in that interval. For example, if M=six months then each snapshot would contain six months of transactions. In various embodiments, a sliding window is applied where the window is parametrized by a time-interval of N (e.g., 1 month), meaning that each consecutive snapshot is offset from the previous by N. Since customers' behavior tends to change over time, the customer representations produced by the GNN can be sent as input to a Recurrent Neural Network (RNN). The RNN combines the current local representation with a per-customer hidden state, maintained across snapshots, to output customer representations that reflect the temporal dynamics.

Figure 7:
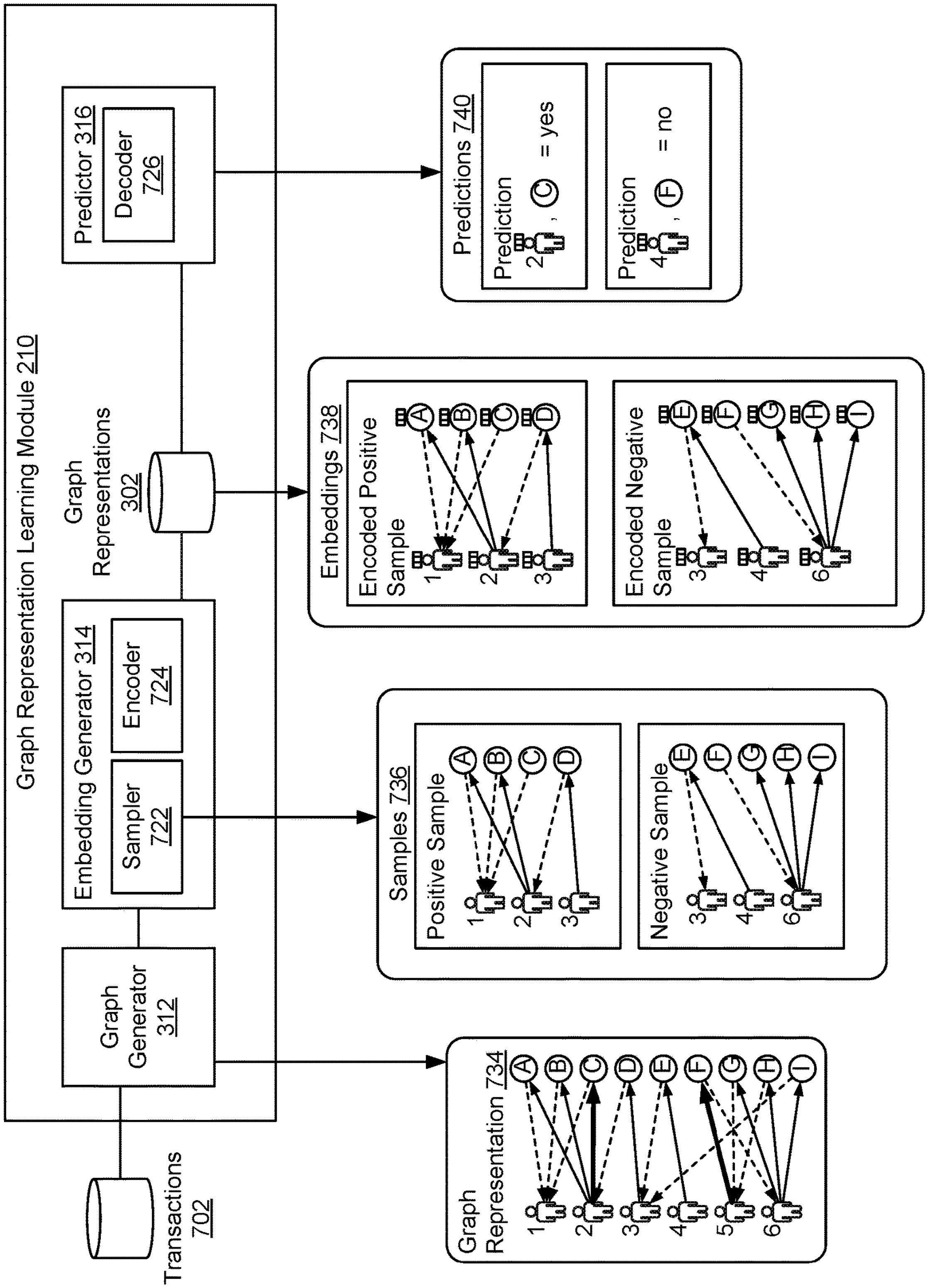
FIG. 7 is a block diagram illustrating an embodiment of a graph representation learning module along with examples of inputs and outputs of various components in the graph representation learning module.

FIG. 7 is a block diagram illustrating an embodiment of a graph representation learning module along with examples of inputs and outputs of various components in the graph representation learning module. Each of the components are like their counterparts in FIG. 3 unless otherwise described. The graph representation learning module is configured to perform self-supervised graph representation learning such as the process of FIG. 4.

The process of FIG. 4 can be thought of as jointly learning an encoder 724 and a decoder 726, where the encoder is given by $$\mathcal{E}(X, A) \rightarrow \mathbb{R}^{N_c \times d_c'} \times \mathbb{R}^{N_t \times d_t'}$$

and the decoder is given by $\mathcal{D}(z_c, z_t) \rightarrow \mathbb{R}^1$. In various embodiments, the encoder 724 receives a node feature matrix $$X: \mathbb{R}^{N_c \times d_c} \times \mathbb{R}^{N_t \times d_t}$$

and an adjacency matrix $$A: \mathbb{R}^{N_c \times N_t} \times \mathbb{R}^{N_t \times N_c}$$

and produces a set of embeddings 738. The embeddings are given by $$Z = [z_c^i, z_t^j], \forall i \in \{0, \ldots, N_c\}, j \in \{0, \ldots, N_t\},$$

with each embedding $$z_c^i \in \mathbb{R}^{d_c'} \text{ and } z_t^j \in \mathbb{R}^{d_t'}$$

denoting the representations for each customer node i and transaction node j, respectively. In this example, the embeddings are stored in graph representations store 302. The decoder 726 receives a pair of customer-transaction embeddings $(z_c, z_t)$, and outputs the likelihood of that transaction existing for that customer. In this figure, an embedding is represented by the three-box grid over the node, so embeddings 738 and the embeddings in 740 are representations of the corresponding graph relationships shown.

In this example of a training process, the predictor 316 makes a first prediction that Customer 2 would make Transaction C, and makes a second prediction that Customer 4 would not make transaction F. If observed behavior differs from these predictions, then an alert may be raised. Here, a positive sample is the pair Customer 2 and Transaction C, as indicated by the edge (represented by a bold arrow) between the two nodes in graph representation 734. The edge is removed during sampling as reflected by samples 736 in which the positive sample of the Customer 2-Transaction C pair is removed. Similarly, a negative sample of Customer 5 and Transaction F is represented by the bold arrow between the two nodes in graph representation 734. This edge is removed during sampling, so the edge is not present in samples 736.

The encoder 724 includes one or more layers of graph convolutional operators. In various embodiments, the operators compute representations by repeatedly sending messages along the edges of a node's local neighborhood. The messages are aggregated and combined with the source node's information. This message passing system enables the representations calculated for each node to take into account the context surrounding it, which may be an important property for applications such as AML. A receptive field of each node is defined by the number of layers of the GNN. That is, each node (or at least one node) has an associated receptive field defined by a number of layers of the GNN such that the number of layers controls a neighborhood considered for message passing. The more layers there are, the farther away the neighbors that affect the central node can be. An example of a graph attention convolution operator (GAT) is given by Equations 1 and 2.

$$z_i' = \Big\Vert_{k=1}^{K} ReLU\left(\alpha_{i,i}^k W^k z_i + \sum\nolimits_{j \in N_{(i)}} \alpha_{i,j}^k W^k z_j\right) \quad (1)$$

$$\alpha_{i,j} = \frac{\exp\left(LeakyReLU\left(a^T [Wz_i \,\Vert\, Wz_j]\right)\right)}{\sum\nolimits_{k \in N_{(i)}} \exp\left(LeakyReLU\left(a^T [Wz_i \,\Vert\, Wz_j]\right)\right)} \quad (2)$$

where N(i) denotes neighbors of node i, || denotes concatenation, with $$\Vert_{k=1}^{K}$$

denoting concatenation over K attention heads, $\alpha_{i,j}$ denotes an attention coefficient between nodes i and j, and W and a denote learnable parameters. In the bipartite graph examples described herein, nodes i and j are of different types (e.g., if node i is a customer node, then node j is a transaction node, and vice-versa), with a different set of learnable parameters for each node and edge type. Edge types may be any relation between nodes such as direction. In various embodiments, the additional expressiveness provided by the attention mechanisms is expected to be beneficial, particularly in situations where the transaction to classify is similar to an existing interaction, allowing the model to assign a higher attention coefficient to that interaction.

The decoder 726 includes a feed-forward, and the prediction for an edge with customer node c and transaction node t is defined by Equation 3.

$$\hat{y} = \sigma(W[z_c \odot z_t]) \quad (3)$$

where ⊙ denotes the Hadamard product and a the sigmoid non-linearity. Given this prediction, the anomaly score is defined as $$1 - \hat{y}_{c,t}.$$

In various embodiments, a single decoder predicts both incoming and outgoing transactions.

In various embodiments, the predictor 316 identifies anomalous transactions within the context of a customer's usual behavior. This usual behavior is determined based on the input graph G, and is leveraged by the decoder 726 to classify new transactions entering the system. In various embodiments, since labels are not available, self-supervision is used. In various embodiments, self-supervised approaches with graphs use the graph structure itself to derive labels. This translates to sampling 722 positive and negative examples 736, together with a loss function that promotes the representations of positive/negative samples to be similar/dissimilar, respectively.

The disclosed techniques configure a network to predict the likelihood of an edge existing between the entities sent as input. In various embodiments, positive examples are defined as customer-transaction edges that exist in the graph and negative examples are obtained through a sampling function S, which randomly samples customer and transaction nodes to create non-edges. This sampling function is merely exemplary and not intended to be limiting as other sampling functions besides uniform negative sampling may be used. The sampling function can use any pre-definable probability distribution.

Edges corresponding to the direction being predicted are severed/deleted. Given a positive example (c, t), and M sampled negative examples (c̃, t̃) from a negative sampling distribution, the encoder and decoder are jointly trained through a standard binary cross-entropy (BCE), defined by Equation 4.

$$\mathcal{L}(c, t) = -\log(\hat{y}_{c,t}) - M \cdot \log\left(1 - \hat{y}_{\tilde{c},\tilde{t}}\right)) \quad (4)$$

In various embodiments, negative examples are only used for training the model. During production, all transactions entering the system are positive examples for which the entities involved are already known. To obtain the corresponding anomaly scores, the same process described herein is used: the directed edge being predicted is severed, followed by using the encoder to obtain the transaction embedding. This embedding is then used by the decoder together with the previously obtained customer embedding (representing the customer's expected behavior) to calculate the anomaly score.

In summary, a forward propagation procedure for a mini-batch scenario includes:

Receiving or obtaining as input one or more of the following: a graph (G) having customer and transaction nodes, a number of layers (L), a neighborhood sampler (N), a mini-batch size (B), an edge sampling function (S), and an edge direction (D). In various embodiments, some of the inputs may be derived from a received graph.

Select B edges from G in direction D

Sample random customer and transaction nodes as non-edges

Figure 8:
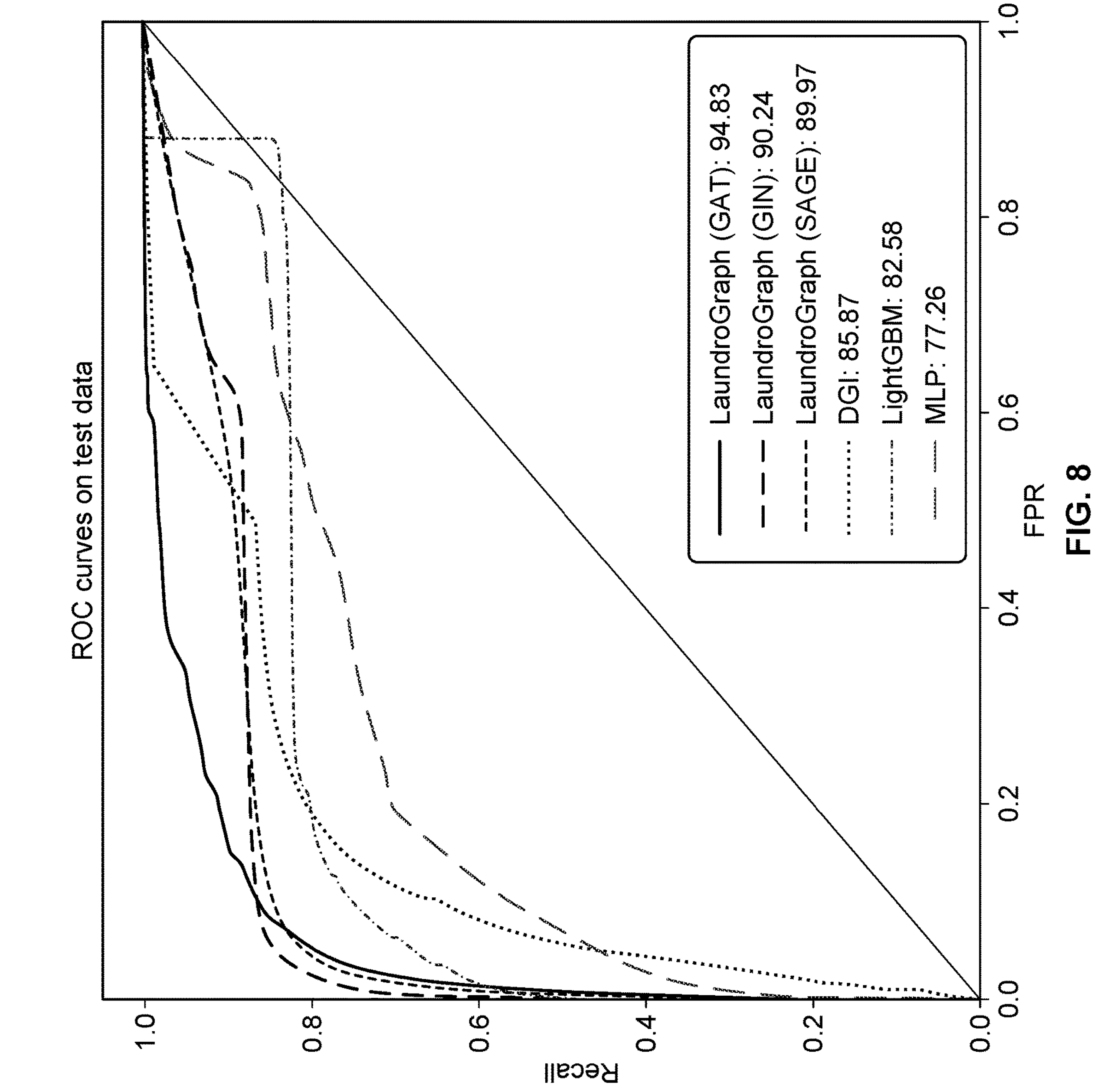
FIG. 8 shows the performance of the disclosed self-supervised graph representation learning techniques compared with some conventional techniques.

If D is outgoing, then delete real outgoing edges; otherwise, delete real incoming edges Input to the first layer is the raw features of all required nodes, e.g., required nodes include nodes to be predicted and those nodes required for the computation with the GNN (L-hop subgraph), which are the neighbors obtained through the neighborhood sampler N Encode nodes to generate embeddings Make a decoder edge prediction using the embeddings FIG. 8 shows the performance of the disclosed self-supervised graph representation learning techniques compared with some conventional techniques. Experiments were conducted using a real-world banking dataset along with other baselines, (e.g., MLP and LightGBM that inform their predictions exclusively through the raw feature information), and several graph-based variants that also exploit the structural information in the graph. Leveraging the information present in the underlying graph consistently improves performance, with the best method achieving an AUC of around 95% and AP of around 96%, an improvement of 12.2 and 6.2 p.p. over the best non-graph baseline, respectively. In some experiments, for the self-supervised objective of edge prediction, jointly training the encoder and decoder achieves superior results compared to pre-training the encoder on a separate self-supervised objective. Nevertheless, there is still room for exploration on how different self-supervised objectives can be combined to derive maximally informative representations.

Experimental results show that the disclosed techniques perform well, e.g., achieving an improvement of 12 p.p. of AUC over the currently existing best non-graph baseline. The disclosed techniques find application in many situations including increasing the efficiency of the reviewing process by supplying AI-powered insights to analysts, which also strengthens the collaboration between humans and AI.

The following figures show examples of uniform manifold approximation and projection (UMAP) embeddings obtained in some embodiments. UMAP is useful to reduce the dimensionality of the input to allow for the visualization and understanding of how the data is distributed in space. UMAP takes a vector of a larger set of numbers (e.g., 256 numbers) and reduces it to a smaller, plottable set of numbers (e.g., 2 numbers).

Figure 9:
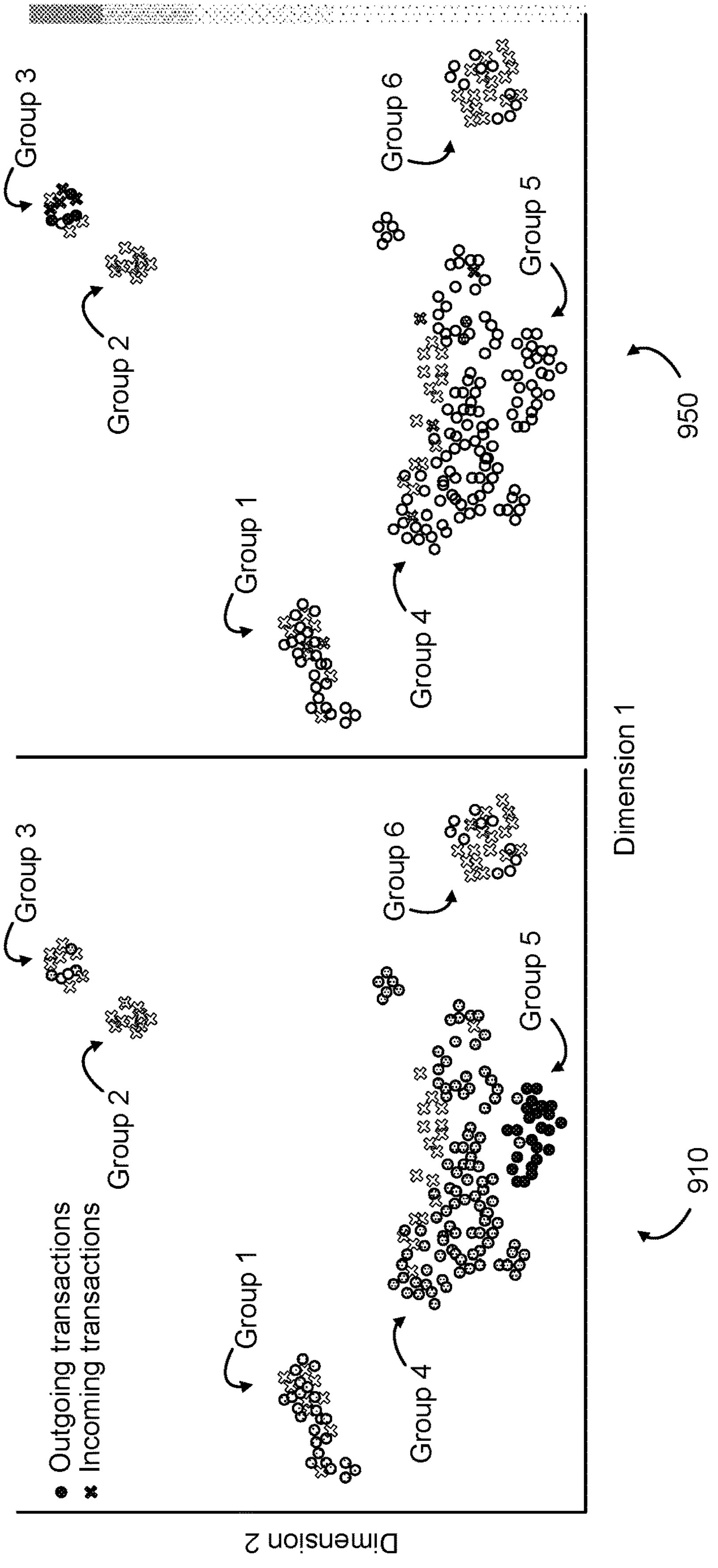
FIG. 9 shows a plot of uniform manifold approximation and projection (UMAP) embeddings obtained in some embodiments.

FIG. 9 shows a plot of uniform manifold approximation and projection (UMAP) embeddings obtained in some embodiments. In this example, UMAP is applied on the transaction embeddings of five different and randomly sampled customers with more than 10 transactions. The marker represents the direction of each transaction, with "o" representing outgoing transactions, and "x" representing incoming transactions. On the left side 910 of the figure, transactions are colored according to their customer, and on the right side, transactions are colored according to their anomaly score. In this example, each class is represented as a cluster of points in a unique color. Here, five different levels of shading represent colors, the colors being purple, blue, green, red, and orange in order of darkest shading to lightest shading. For example, Group 1 is primarily green, Group 4 is primarily blue, Group 5 is primarily purple, and Group 6 is primarily orange. These colors are merely exemplary and not intended to be limiting. Different colors of visual differentiators may be used.

Referring to the left side 910, transactions are naturally clustered according to their customer, and there are multiple clusters of activity for each customer. There is some level of separability between customers. A customer is expected to have several clusters of activity representing the different types of counterparts interacted with, as well as some intra-cluster variability representing the properties of each transaction.

For example, during a test period, for the green customer, all outgoing transactions except one were received by the same counterpart, resulting in the cluster labeled "Group 1." The remaining outgoing transactions can be seen farther away, near Group 6. At first glance, this transaction may appear to be anomalous, however, the history observed during the training period is important for confirming/concluding the nature of the transaction, as similar interactions between those two entities occurred frequently.

As another example, Group 5 corresponds to a purple customer. In this case, the cluster represents interactions with several different counterparts whose behavior is very similar. More specifically, almost all counterparts only received transactions from the purple customer during the training period. Referring to the right side 950 of the figure, generally speaking, transactions farther away from their respective non-anomalous clusters (i.e., the "expected" behavior) usually have a higher anomaly score. This can be observed, for example, with the anomalous cluster (Group 3) at the top, and with the scattered incoming transactions from the orange customer (Group 6).

As described herein, aggregating the transactions for a customer under review according to meaningful categories is an important component of the AML investigation process in various embodiments. Aggregating, on-demand, the transactions shown to the analyst according to these clusters manifesting in the latent embedding space goes beyond simple aggregation schemes, grouping the different transactions according to their contextual information and potentially highlighting clusters of normal/anomalous activity.

Figure 10A:
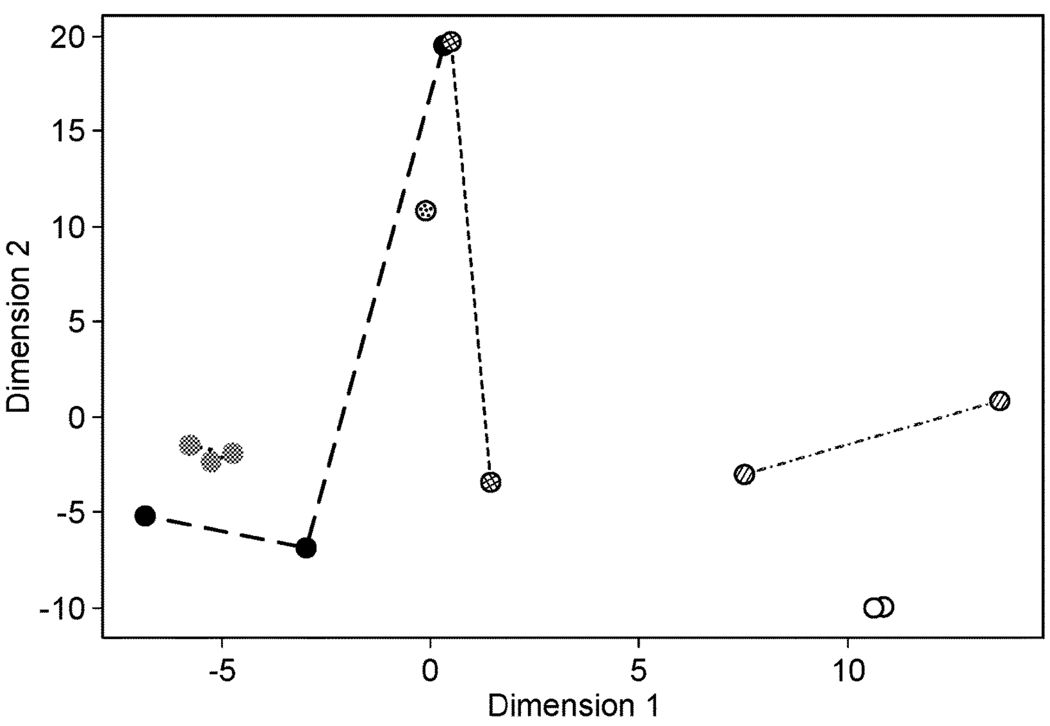
FIG. 10A shows a plot of another uniform manifold approximation and projection (UMAP) embeddings obtained in some embodiments.

FIG. 10A shows a plot of another uniform manifold approximation and projection (UMAP) embeddings obtained in some embodiments. In this example, UMAP is applied on six different customers, across three snapshots using a rolling time window, together with corresponding pairwise cosine similarity heatmaps calculated on the original latent embedding space. Each snapshot describes a graph based on transactions collected over six months, with each subsequent snapshot sliding the window one month into the future. Comparing the embeddings produced for the same customer across the different windows of time can be seen as a measure of behavior divergence.

Figure 10B:
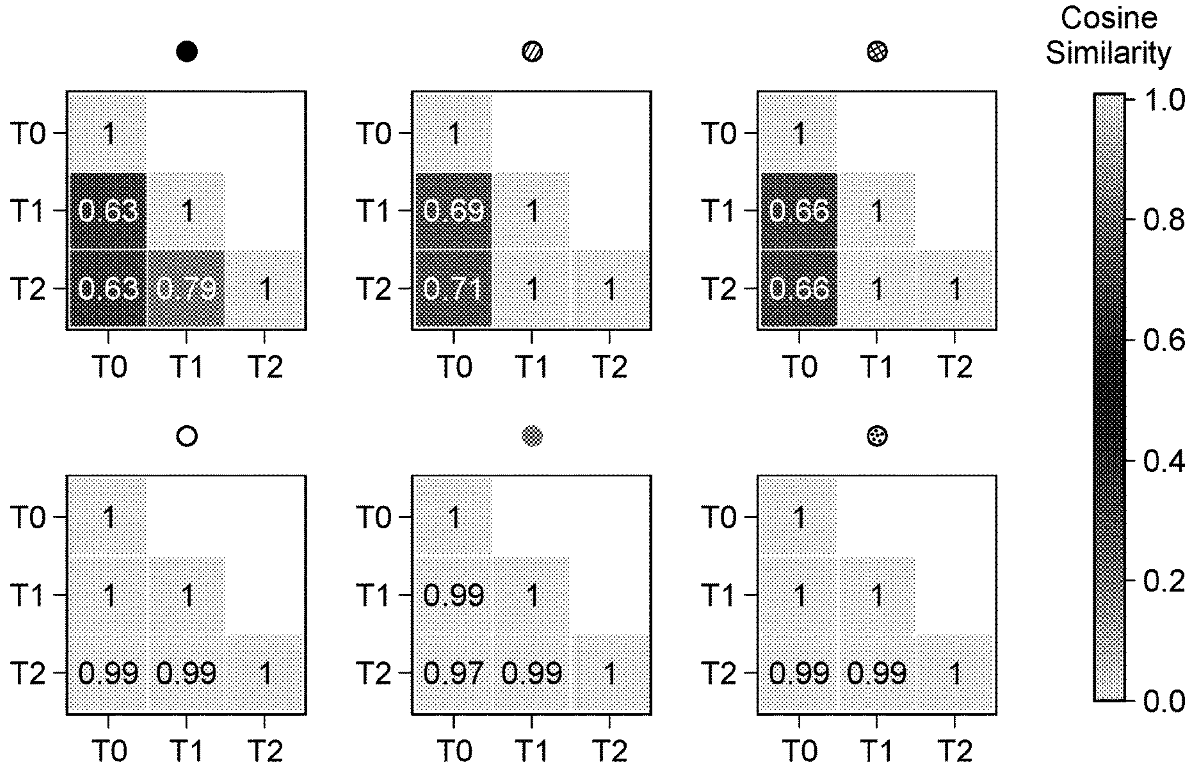
FIG. 10B shows a plot of heatmaps corresponding to the plot of FIG. 10A obtained in some embodiments.

FIG. 10B shows a plot of heatmaps corresponding to the plot of FIG. 10A obtained in some embodiments. This example shows instances of stable and diverging behavior, with divergences observed through shifts in the embedding space, visualized through the associated dashed lines in FIG. 10A, and through darker cells in FIG. 10B. For the customers with stable behavior, in general, the corresponding subgraphs sprawling from the interactions remain largely similar across snapshots. In other words, the new transaction nodes introduced connect to either existing customer nodes, or introduce a new customer node with a neighborhood similar to existing nodes at the corresponding depth. For customers exhibiting a divergence in behavior, the opposite is observed. Stable vs. diverging behavior can be determined based on a threshold of similarity, which may vary depending on use case. In the example, stable behavior is indicated by very high (e.g., 90% or more) cosine similarity.

For the sake of visualization for this example, only customers that have new activity in the differing time periods are considered. Furthermore, because the typical customer retains similar embeddings, half of the customers are sampled from the pool of customers with one value of cosine similarity below 0.8, and the other half from the remaining customers, corresponding, respectively, to the top and bottom half of the heatmaps shown FIG. 10B.

One reason for divergence of representations is due to a new type (e.g., incoming or outgoing) of transaction being performed for the first time. This is the case for the orange customer, for example. Another reason for divergence, exemplified through the blue and green customer, is associated with the counterparts interacted with and the structure of their neighborhoods. As described herein, a consequence of the message passing mechanism is that each message contains information about the sender's neighborhood. As such, even if the number and type of transactions performed remain the same across snapshots, a customer can obtain different representations if the received messages describe very different neighborhoods (e.g., due to interacting with new counterparts or if the existing counterparts shift in behavior). This is alleviated for high centrality nodes, as the contribution of each message on the final representation is diminished. In other words, the more that is known about a customer's transactional behavior, the more stable their representations will be.

The representations may be derived from various layers of the embedding generator 314 (e.g., as shown in FIG. 7). By using the representations at different depths of the network, different information can be prioritized, highlighting different types of behavior. For example, using the representations of the first layer provides behavior divergence measures that reflect exclusively the source customer's transactions. Using the representations provided by the second layer additionally considers the counterparts interacted with.

For this example, the representations used are the ones derived by the last/deepest layer of the module 210 (e.g., the third layer). In this example, using three layers means that the counterpart's transactions also have an impact on the source representation. Doing so results in more stable representations, where interacting with new entities can lead to similar embeddings if these entities are similar to ones already interacted with in the past. Conversely, if the counterpart's transactional behavior changes drastically between periods of time, then the source embedding will also reflect that, giving an illusion of behavior divergence, as exemplified through the blue customer. Behavioral changes that are considered to be drastic can be determined based on embeddings of the entity and a metric of distance/similarity (e.g., cosine similarity) as described herein. A threshold can be set to differentiate stable vs. diverging behavior. For example, cosine similarity above 95% indicates stable behavior while a value below 70% indicates drastic divergence/change in behavior.

This divergence information can be displayed on a user interface. An analyst can then view the information to accelerate the contextualization of the customer, providing a continuous macro-view of the customer's behavior that can be used to compare with past decisions. For example, if a customer has had several false positives in the past, and their representation for the current assessment does not diverge drastically from those periods, then it is expected that the current assessment will also be a false positive, introducing a probabilistic prior to the analyst before any transaction is investigated.

The disclosed techniques for self-supervised graph representation learning can be applied to provide a fully self-supervised approach to support an alert reviewing process through meaningful insights. The disclosed customer-transaction bipartite graph through GNNs provide representations that characterize each entity given its surrounding context. The representations can be used as a reference point of expected behavior used to score the anomaly of new transactions entering the system. The representations may provide a unified entry point for determining other useful insights for the reviewing process, such as clustering the transactions of each customer, identifying periods of abnormal activity of a customer under review, or the like.

In various embodiments, additional information may be incorporated into the graph in the form of different types of nodes e.g., merchants and card transactions. In various embodiments, the temporal component present in the data can be exploited through a sequential model that connects different graph snapshots in time, an example of which is shown in FIG. 6. This would allow the representations of customers to capture the intrinsically evolving nature of a customer's transactional behavior, deriving representations aware of the past behavior not explicit in the input graph.

The disclosed techniques can be integrated within another system such as the alert review system of FIG. 1. For example, self-supervised graph representation learning can be applied for AML reviewing with custom visualizations that digest the provided insights and display them in an easy-to-understand manner, decreasing the burden and increasing the efficiency of AML analysts. An example of a broader system for AML review is Case Manager by Feedzai®.

The following figures show some examples of a graphical user interface for an alert review system such as the one shown in FIG. 1.

Figure 11:
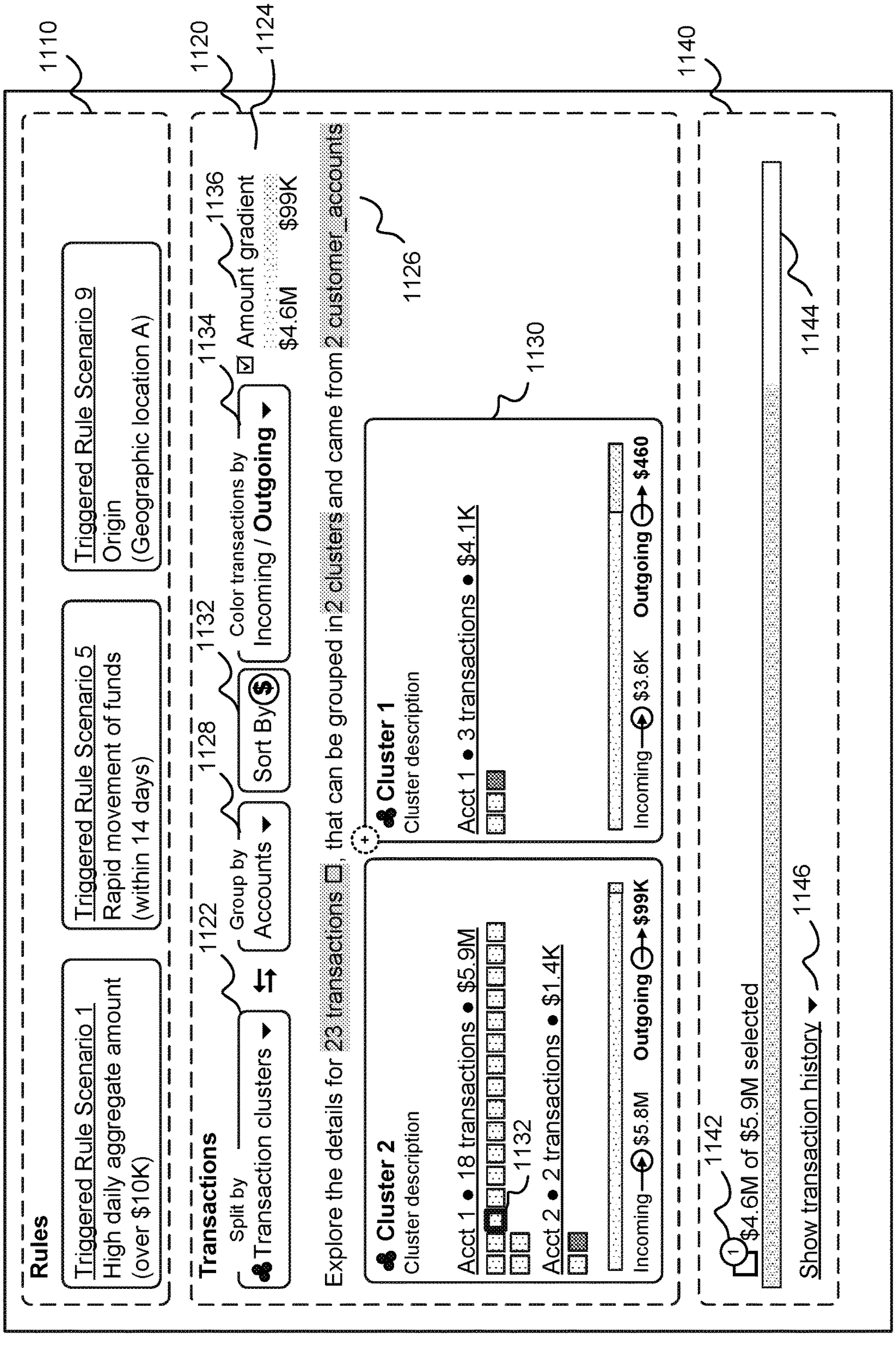
FIG. 11 shows a graphical user interface for alert review obtained in some embodiments.

FIG. 11 shows a graphical user interface for alert review obtained in some embodiments. This graphical user interface is an example of an interactive visual representation of different groups obtained through a process such as the one shown in FIG. 1. A user interface obtained by the process of FIG. 1 may include one or more of the sections shown in FIG. 11 and the information may be represented in other ways.

The user interface displays various insights along with a visual representation of the data. The user interface may be used by an analyst to review an alert. The example of money laundering or anti-money laundering (AML) will be used in this disclosure, but this is not intended to be limiting as the disclosed techniques find application in other areas as well. The alert review system may be used along or integrated with another system where other relevant details of events are also available.

In various embodiments, the user interface includes one or more sections: rules 1110, transactions 1120, and a tracker 1140 to keep track of selected transactions. This user interface may provide diverse views of the same dataset.

The rules section 1110 displays the relevant rules for the transactions such as the rules that were triggered. Displaying the triggered rules (rule combinations/scenarios) may help an analyst to understand the information and create a Suspicious Activity Report (SAR), for example. In various embodiments, each panel (e.g., Triggered Rule Scenario 1) corresponds to a triggered rule scenario, which may be a group of combined conditions that, if met, raise an alert. The following is an example of a rule scenario: IF the sum of incoming transactions per account meets a first threshold (where the threshold is some AML, reportable amount, definable by an organization or by a regulatory body) OR the sum of outgoing transactions per account meets the first threshold OR the sum of incoming transactions per customer meets a second threshold (where the threshold is some AML minimum transaction amount, definable by an organization of regulatory body) OR the sum of outgoing transactions per customer meets the second threshold, then an alert is generated.

The rules can be displayed in a variety of manners and in this example, each rule scenario is displayed in a respective card/panel showing the content of the rule (e.g., "high daily aggregate amount (over $10K)). The cards represent the rule scenarios triggered in a specific alert. The rule scenario's name (e.g., Triggered Rule Scenario 1) and a summary/description (e.g., High daily aggregate amount (over $10K) may be included in each card. In various embodiments, selecting one or more of the cards will filter out the transactions that did not trigger that particular rule(s).

The placement and content of the rule panels are merely exemplary and not intended to be limiting as a different placement or content may be displayed. For example, rule cards may be displayed running from top to bottom of the screen as further described with respect to FIG. 14. Here, three rule scenarios (1, 5, and 9) were triggered by the transactions shown in section 1120.

The transactions section 1120 displays different views for the same data without losing track of each different movement in response to user interaction. For example, an analyst can interact with the data as further described herein to explore a network of interactions. In this example, the transactions section 1120 includes a controls menu 1124, and transaction groups shown in one or more cards 1130. In this example, menus such as 1122 and 1128 are dropdown menus but they may be implemented in other ways that enable a user to make a selection between various options.

In various embodiments, the controls menu displays a set of options that allow a user to aggregate the data in various ways. Split by menu 1122 splits the different groups (cards) according to the input variable. Put another way, the user can indicate a variable by which to split cards or a variable by which to group elements within a card. In this example, groups are split by transaction clusters. The clusters of transactions may be determined using the techniques described herein, e.g., the process of FIG. 4 Another example, in which groups are split by counterparts, is further described with respect to FIG. 12A. In various embodiments, "split by" can default to a specific input variable such as counterparts (entities the customer has interacted with).

A card 1130 is generated and displayed for each group of the variable. Here, each transaction cluster is displayed in a respective card. There are two transactions clusters, Cluster 2 and Cluster 1 as shown. The order in which cluster cards are displayed may be determined by the "Sort By" button as further described herein.

Group by menu 1128 controls how the elements are aggregated inside the card. In this example, transaction clusters are grouped by account. Referring to the Cluster 2 card, transactions associated with account Acct 1 are shown together and below them transactions associated with account Acct 2 are shown together. In various embodiments, if no value is selected (e.g., group by "null") then transactions inside the cards are not further split. Here, if no value is selected, then all transactions inside Cluster 2 would be displayed together and similarly all transactions inside Cluster 1 would be displayed together instead of separated by account as shown.

Menu options/categories may include, but are not limited to: transaction clusters, money flow, accounts, and time. In various embodiments, categories are shared between the two dropdowns, apart from time, which is only available in menu 1122.

Between menus 1122 and 1128, a button (two arrows in this example) can be used to swap the variables in use in the different groups.

Icons may be helpful to explain connections between the menus 1122 and 1128 and the cards 1130 that group the transactions. For example, the text "transaction clusters" in the menu is displayed alongside a specific icon (three circles), and the icon is also displayed in the cards with the text "Cluster 2" and "Cluster 1." Although not shown, other icons may be used. For example, accounts are represented with a bank icon in menu 1128. The same icon is then repeated in all the cards where an account name is displayed. For example, the icon precedes the text "Acct 1" and "Acct 2" in the card for Cluster 2. Icons may be used for accounts, money flow, transaction clusters, etc.

In various embodiments, the controls menu 1124 displays controls for how cards and colors are displayed. For example, the "Sort By" button 1132 enables a user to define how the cards 1130 are displayed (e.g., by the count of events or by the summed amount). In this example, the cards are sorted by amount, so Cluster 2 is displayed first (to the left of) Cluster 1 because the total amount is greater.

The Color transactions by menu 1134 enables a user to control how to color the transactions. Different subsets of the transactions can be colored differently, such as incoming vs. outgoing flow, rule-triggering transactions (those transactions that triggered a rule) vs. non-rule triggering transactions (those transactions that did not trigger a rule), etc. For example, incoming flow is a first color and outgoing flow is a second color (here, represented by the bolder text). The same colors would be displayed throughout the user interface. For example, the squares representing each transaction (further described herein) would have either the first color or the second color depending on if the transaction is incoming or outgoing. In this example, the darker shading in the square corresponds to outgoing and the lighter shading corresponds to incoming. The stacked bar at the bottom of the card is also colored. Referring to the Cluster 2 card, the "Incoming $5.8M" text and (majority) section of the bar is a first color (here, lighter shading) while the "Outgoing $99K" text and section of the bar is a second color (here, darker shading). The coloring enables a user to quickly see the relative amount/size of incoming vs. outgoing flows.

Gradient option 1136 allows a gradient to be turned on and off. In various embodiments, the gradient is amount-based, where transactions with a higher amount will be given higher opacity. The gradient scale can be independent for the different color scales. If in the universe of incoming transactions, the maximum is $10,000, and for the outgoing ones, the highest value is $5,000, both will be given full opacity. This allows the user to quickly identify the most important movements in both groups. In other words, selecting the amount gradient option helps to visualize which are the transactions with highest amounts.

Below the controls menu 1124, transaction information is displayed. A summary 1126 is shown: "Explore the details for 23 transactions [represented by squares], that can be grouped in 2 clusters and came from 2 customer_accounts." The summary/description is dynamic and can be adapted to the type of selects that a user makes. For example, if the user splits by counterparts instead of clusters, the summary is updated accordingly (e.g., comparing 1226 which refers to counterparts to 1126 which refers to clusters). This section shows the groups that were formed based on the options selected in the controls menu 1124. A user can interact with the data to further explore and identify potentially suspicious movements.

In this example, transaction data is represented by a unit chart in which the number symbols in the chart corresponds to the underlying transactions being represented. Here, the symbol is a square, so each transaction is represented by a single square. This representation of data enables quick identification of outliers in a group (by identifying the group with a disproportionately low number of data points, or the transaction with highest amount) or interaction with individual elements.

As described herein, the transactions are shown within a card. The card displays information regarding the various breakdowns resulting from user selections in the controls menu 1124 and statistical information such as regarding the counts and summed amount of movements represented. The card includes a stacked bar chart to visualize the amount of money (or more generally, volume of units) incoming and outgoing for the group.

In various embodiments, cards can be hidden or additional cards shown. Here, a button in the top right corner of the last displayed card (Cluster 1) allows that card (or group of cards) to be hidden or shown. This can be helpful when there are a large number of cards. To avoid overwhelming a user, only the top N (e.g., five) cards are displayed. Selecting a button on the last card will show additional cards, showing hidden cards (e.g., cards beyond the first N). In this example, only the top N=2 cards are displayed and selecting the "+" button on the top left corner of the second card would cause additional cards to be displayed.

Figure 15A:
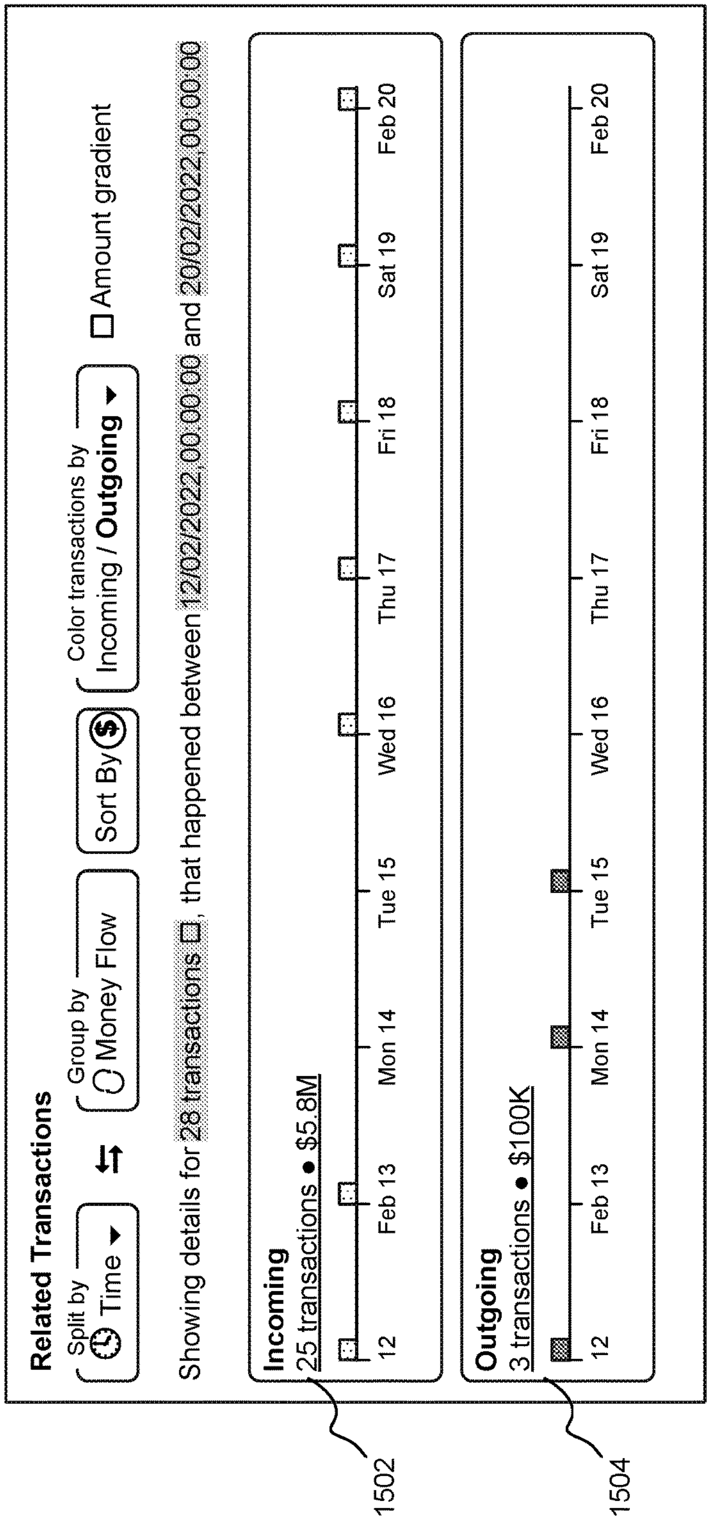
FIG. 15A shows a graphical user interface for alert review including a transaction timeline obtained in some embodiments.
Figure 15B:
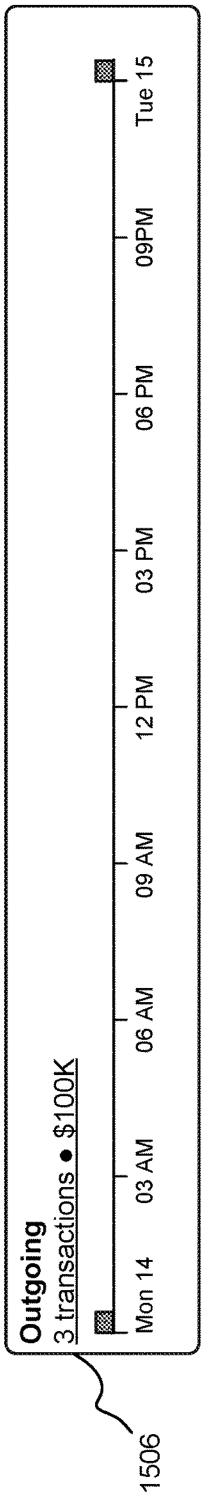
FIG. 15B shows a graphical user interface for alert review including zoomed-in transaction timeline obtained in some embodiments.

The cards 1130 may have various layouts. For example, if there is only one transaction in the group, a simplified version of the card is displayed. As another example, if the selected first-level group is time, a timeline of the transactions will be presented, an example of which is shown in FIGS. 15A and 15B.

In various embodiments, only the first M (e.g., 50) transactions are shown. This avoids the interface unnecessarily expanding vertically when the number of transactions represented is high. A "show more" button with a counter 1142 can be displayed to enable the user to explore the remaining movements on-demand.

In this example, tracker section 1140 includes a counter 1142 and a chart 1144 (here, a stacked bar) to keep track of selected transactions. When clicking on a square, the stacked bar 1144 and counter 1142 below the transaction cards 1130 will be updated. The bar represents the total amount of money for the movements in the specific alert. At each update, it shows the relative amount of the selected movement. This can be used to keep track of the selected elements when changing between groups or filters.

In this example, one of the transactions 1132 is selected, which populates the counter 1142 (showing 1 in the circle) and stacked bar chart 1144 showing that the selected transaction amount is $4.6M out of the total amount of all transactions ($5.9M).

Figure 13A:
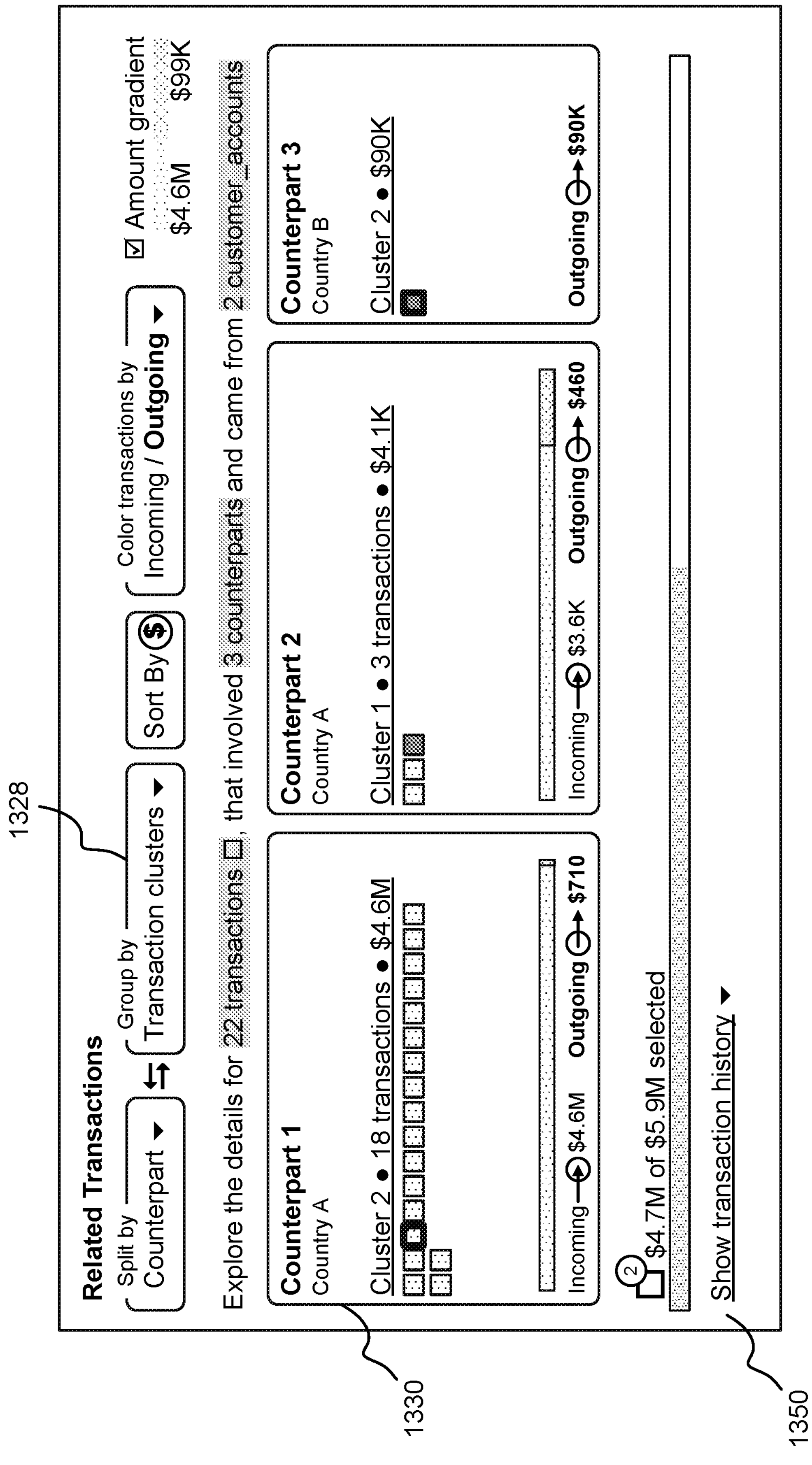
FIG. 13A shows a graphical user interface for alert review in which transactions are selected for further review obtained in some embodiments.
Figure 13B:
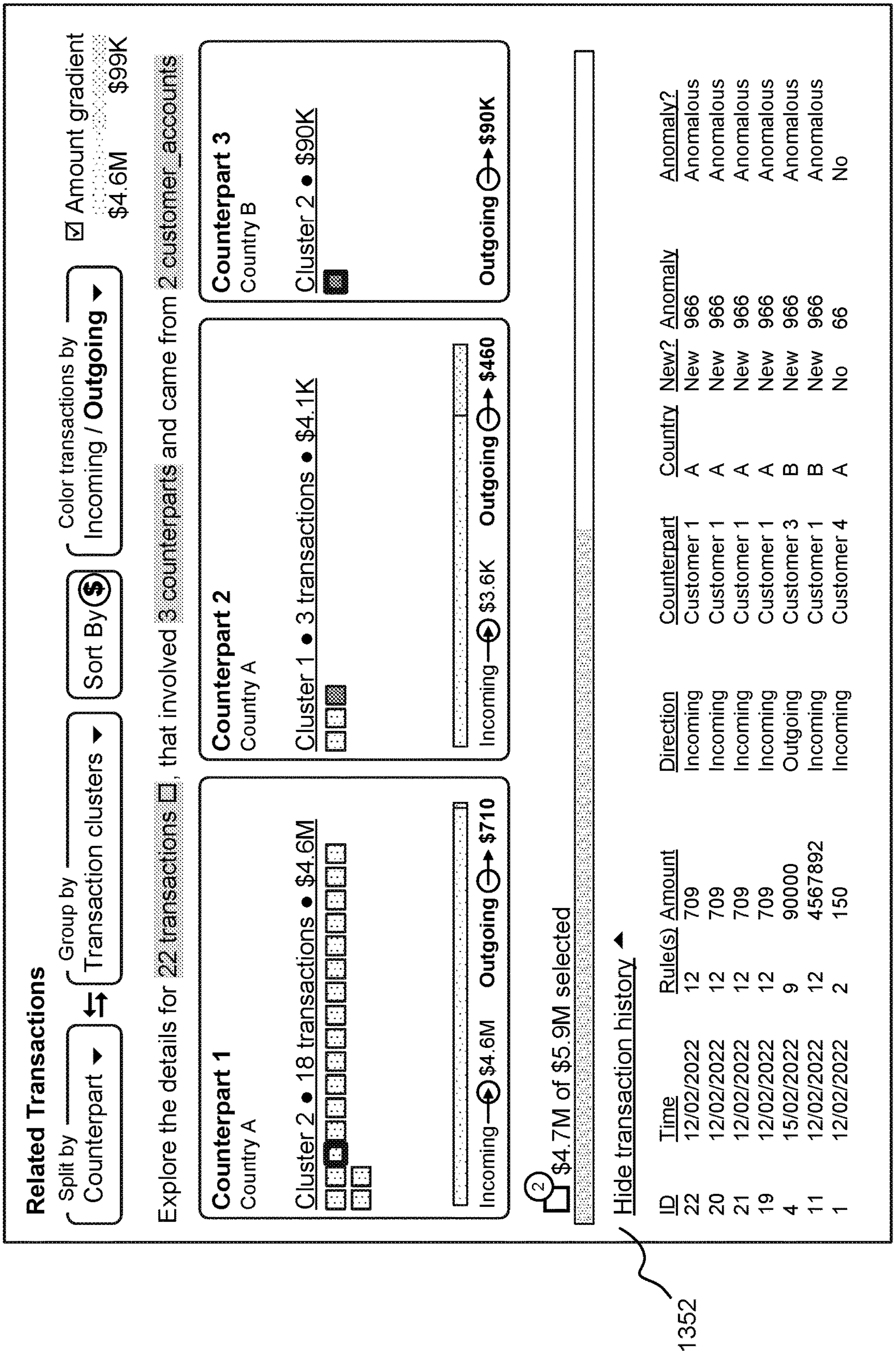
FIG. 13B shows a graphical user interface for alert review in which details for selected transactions are displayed as obtained in some embodiments.

In various embodiments, data (e.g., a table with all data) 1146, visible on demand, can be presented as further described with respect to FIGS. 13A and 13B. The table with the reference dataset is available on-demand. In various embodiments, if any transaction is selected, it will appear on the top of the table with a different border.

Insights (such as per-transaction anomaly score, per-customer transaction clustering, per-customer behavior over time, explanations, etc.) may be displayed in the user interface as follows. As described herein, a user can opt to group the data by transaction clusters (here, via menu 1222). The clusters are pre-computed by clustering the derived transaction representations according to the disclosed techniques. Grouping by the transaction clusters highlights behavioral patterns, which a user may find helpful for understanding the customer and highlighting groups of transactions that deviate from expectations. For example, the user may then further investigate the suspicious/deviating transactions.

In various embodiments, a per-transaction anomaly score is shown through a categorical label (anomalous/non-anomalous) and a score to quantify how much the corresponding movement deviates from the customer's usual behavior. This information highlights potentially suspicious movements, increasing efficiency by directing the user's attention to a subset of relevant transactions. An example is shown in FIG. 13B.

Figure 16:
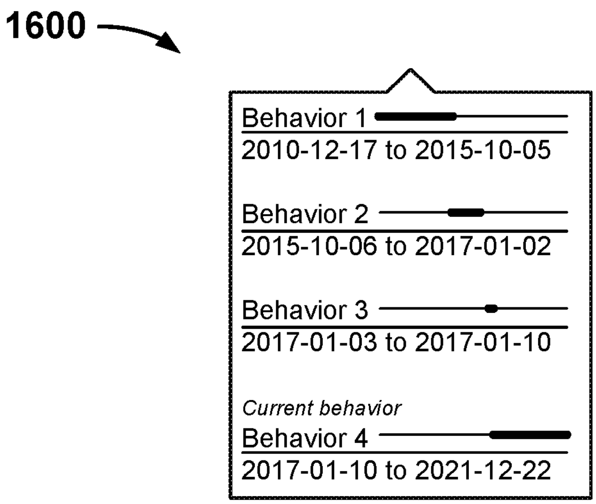
FIG. 16 shows a graphical user interface for alert review including per-customer behavior over time obtained in some embodiments.

Per-customer behavior over time can be shown as a tag (a button-like element), displaying how many periods of distinct behavior were found for that specific customer, an example of which is shown in FIG. 16.

Various elements may be accompanied by a description provided by an explanations insight. In FIG. 11, an example of an explanation insight is the cluster description inside each card below the title. A user may find the explanations helpful for deciding whether the reasoning of the machine learning model exposed by the explanations is relevant within the context of that assessment.

By way of non-limiting example, the user interface can be developed using a tool such as React. The charts may be created with visx, and the buttons and icons may be generated with the MUI package.

Figure 12A:
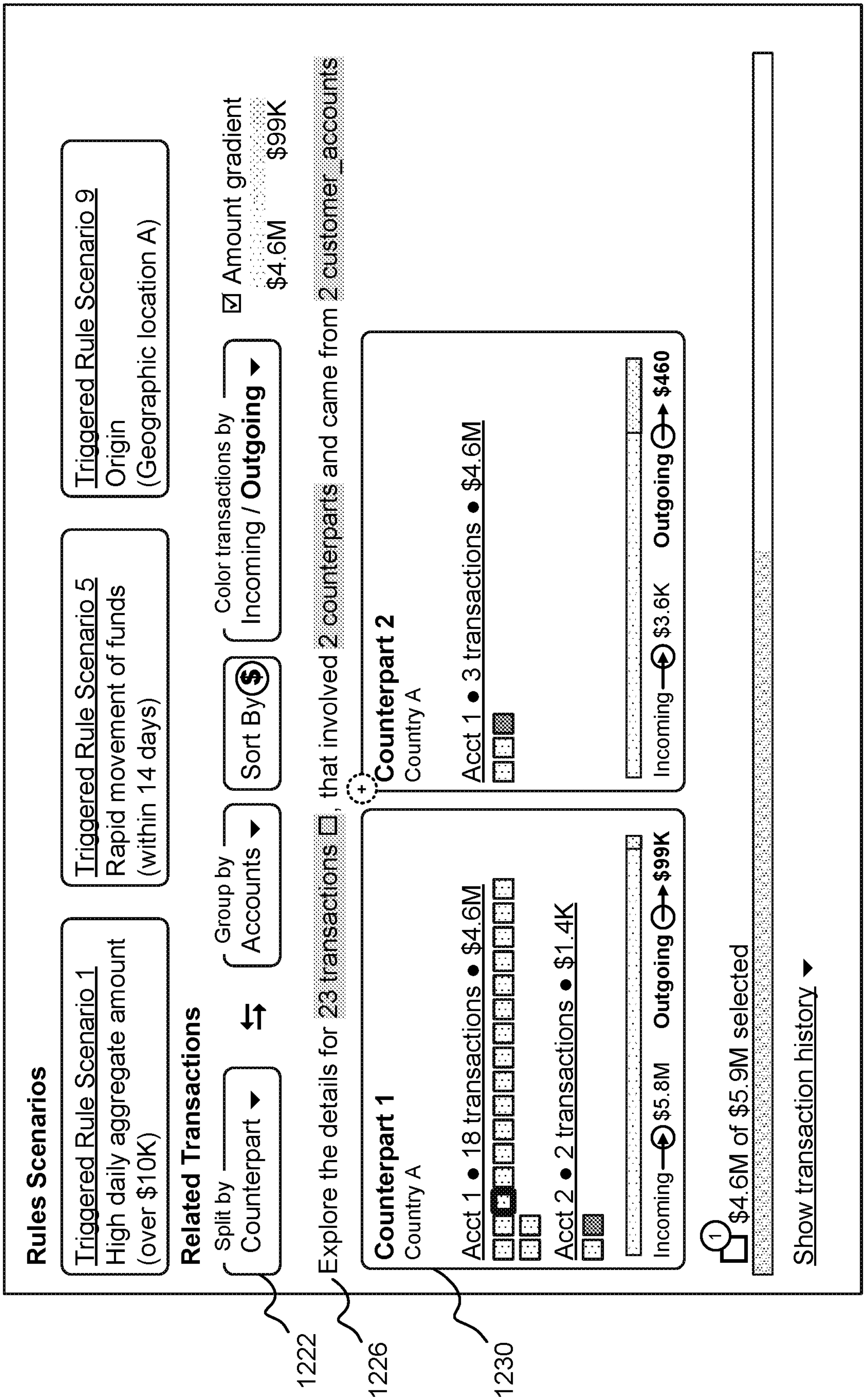
FIG. 12A shows a graphical user interface for alert review in which transactions are split by counterpart obtained in some embodiments.

FIG. 12A shows a graphical user interface for alert review in which transactions are split by counterpart obtained in some embodiments. Each of the components are like their counterparts in FIG. 11 unless otherwise described. In this example, the transactions are grouped by counterpart (the entity from/to whom the customer sent/received funds) and accounts. This is indicated by menu 1222. The summary 1226 also indicates that the transactions involved two counterparts. Thus, a unique card 1230 is generated for each counterpart (instead of cluster in FIG. 11).

Figure 12B:
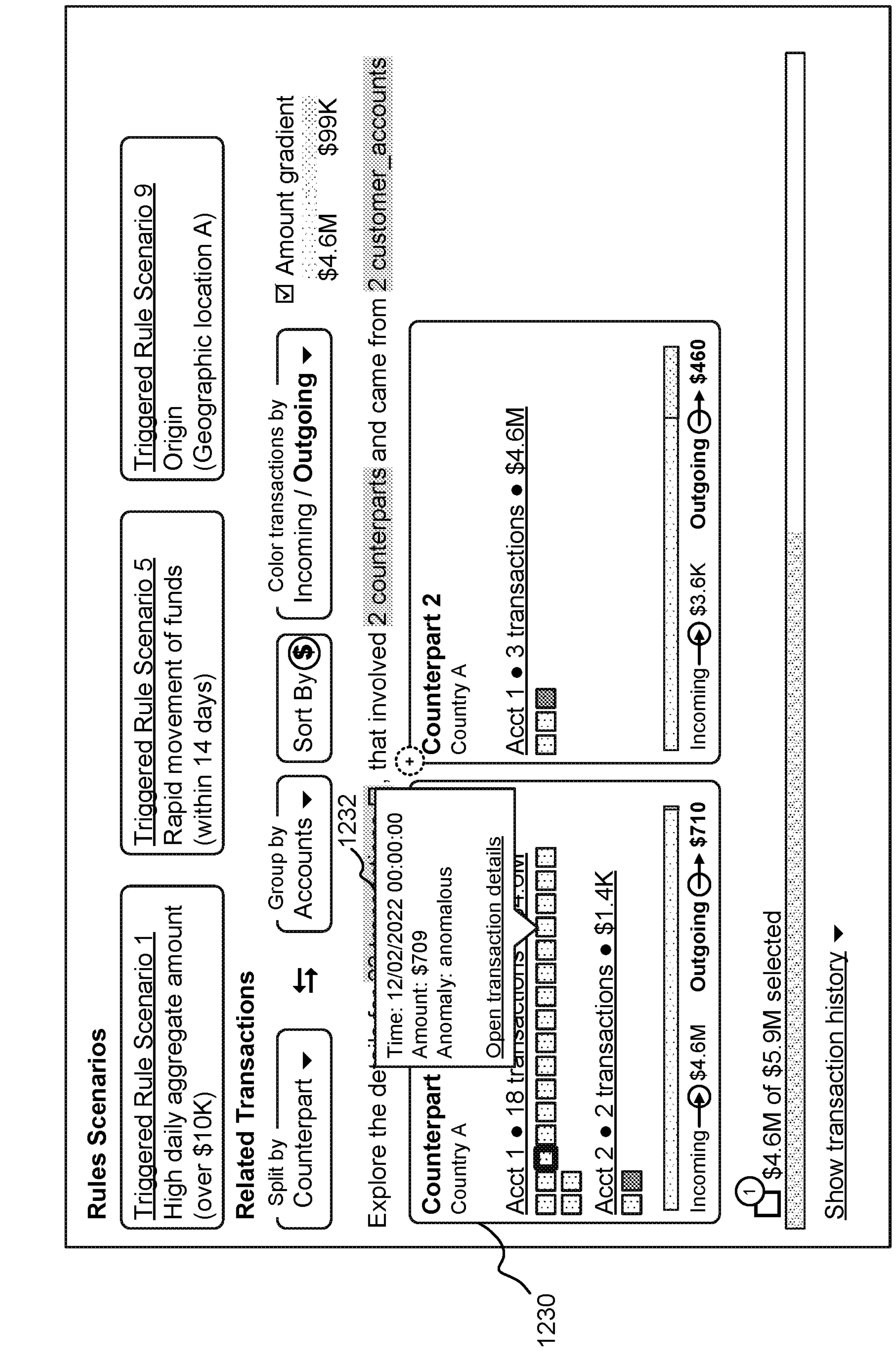
FIG. 12B shows a graphical user interface for alert review in which transactions are split by counterpart and details for a specific transaction obtained in some embodiments.

FIG. 12B shows a graphical user interface for alert review in which transactions are split by counterpart and details for a specific transaction obtained in some embodiments. Each of the components are like their counterparts in FIG. 12A unless otherwise described. In this example, hovering over a transaction square causes further details to be displayed in a pop-up 1232. Here, the further details show the time, among and anomaly status of the transaction, along with a link for more details. This enables a user to quickly scan through basic details of a specific transaction and drill into further details by selecting a link in the pop-up.

FIG. 13A shows a graphical user interface for alert review in which transactions are selected for further review obtained in some embodiments. Each of the components are like their counterparts in FIG. 11 or FIG. 12A unless otherwise described. For simplicity and unlike FIGS. 11 and 12A, this example omits the rules section. In this example, the transactions are grouped by transaction clusters as indicated in group by menu 1328. This causes the cards 1330 to show information for a specific counterpart, where the information is grouped by cluster. Unlike the examples in FIGS. 11 and 12 in which a single transaction square is selected, here, two squares have been selected (one from Counterpart 1 and one from Counterpart 3). The stacked bar and counter reflect this selection by showing that "2" transactions are selected in the circle and the total amount of the two transactions. Selecting "Show transaction history" link 1350 causes transaction history associated with the two selected squares to be displayed as depicted in the next figure.

Figure 14:
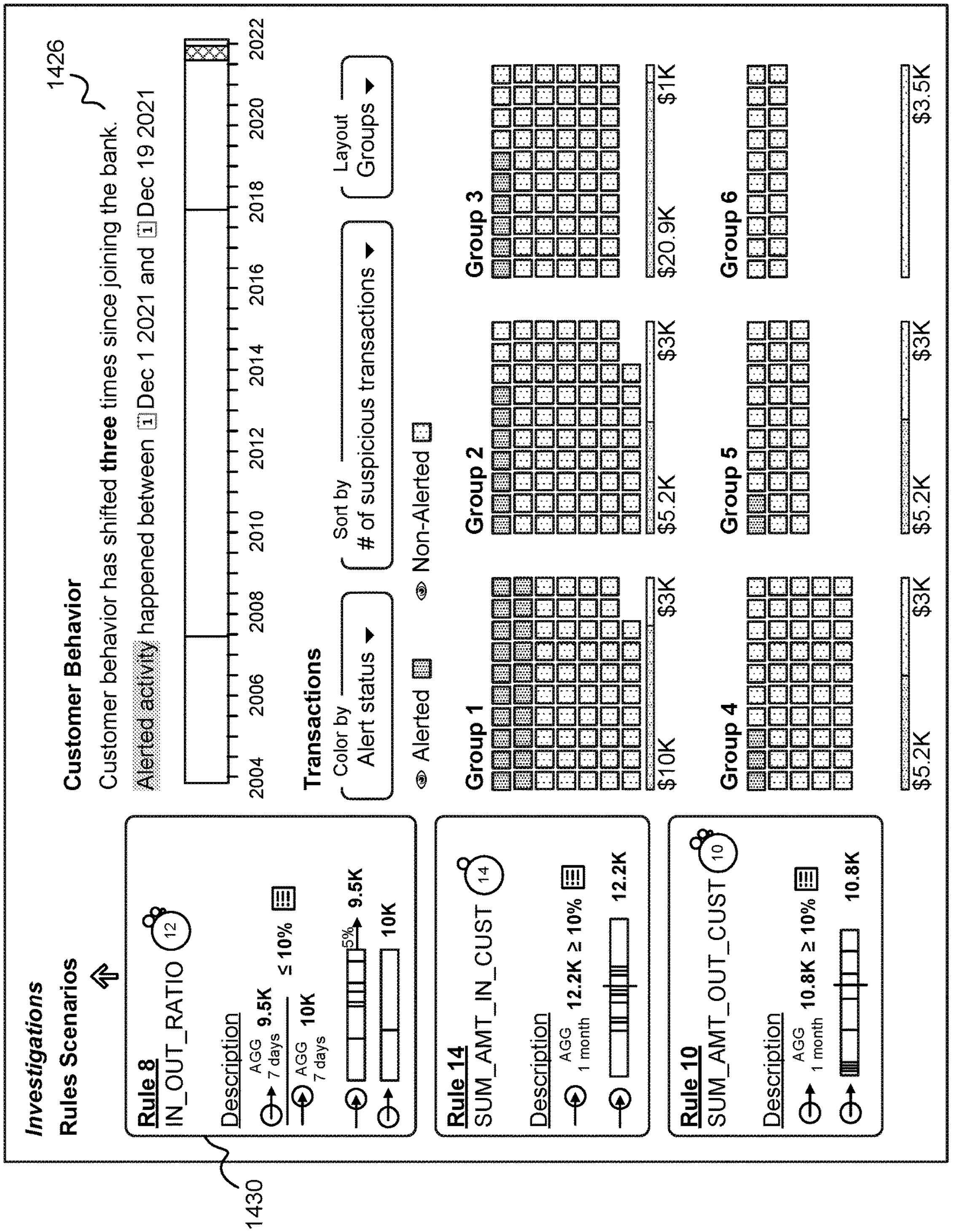
FIG. 14 shows a graphical user interface for alert review including an investigation dashboard obtained in some embodiments.

FIG. 13B shows a graphical user interface for alert review in which details for selected transactions are displayed as obtained in some embodiments. Each of the components are like their counterparts in FIG. 13A unless otherwise described. Here, the transaction history 1352 is shown in a table. The number of columns and information displayed is merely exemplary and not intended to be limiting. Here, each row in the table corresponds to an individual transaction, and the columns indicate properties of the transaction including: ID (a unique identifier), time, triggered rules (e.g., AML rule), amount (in dollars or other currency), direction, counterpart, country (e.g., geographical location), whether the counterpart is new (has not been seen interacting with this particular customer), anomaly score, and whether the transaction is anomalous. At least some of this information may be determined using the self-supervised graph representation techniques disclosed herein. For example, a per-transaction anomaly score is shown through a categorical label (anomalous/non-anomalous) in the last column and a score in the second to last column to quantify how much the corresponding movement deviates from the counterpart's usual behavior FIG. 14 shows a graphical user interface for alert review including an investigation dashboard obtained in some embodiments. Each of the components are like their counterparts in FIG. 11, FIG. 12A, or FIG. 13A unless otherwise described.

One or more rules cards 1430 may be displayed. Unlike the rule cards described herein, the rule cards here show a description with symbols corresponding to incoming and outgoing flows. Referring to rule card 1430, which is for an incoming to outgoing ratio being less than 10%, the description shows the condition(s) that trigger the rule, namely if the ratio of the aggregate (over 7 days) incoming amount to the aggregate (over 7 days) outgoing amount is less than 10%. Here, the incoming amount is $9.5K and the outgoing amount is $10K, so the rule is triggered. Specific transactions can be viewed by selecting the icon next to the description. The amounts are obtained from the transactions and automatically populated in the rule card. For example, the values 9.5K and 10K in panel 1430 are obtained by the seven-day aggregate amount of outgoing (9.5K) transactions and incoming (10K) transactions for a particular customer. The stacked bar at the bottom of the card shows the patterns, which may be helpful for a user to quickly determine money flows.

A summary section 1426 summarizes the customer's behavior, such as the number of times customer behavior has shifted and the time period during which alerted activity occurred. A timeline is shown to indicate the times the customer's behavior shifted, with the highlighted section to the far right of the timeline indicating the period of alerted activity.

Similar to the other user interfaces described herein, the information can be displayed according to a user's selection from the menus. Here, the layout is by groups, sorted by the number of suspicious transactions (each represented by a square), and colored by alert status. In the first group, there are 68 transactions, of which 14 are suspicious (alerted) as indicated by the darker shading. This, this group is displayed first to reflect sorting by number of suspicious transactions. Each group also shows a stacked bar with the amount of all the alerted transactions compared with the amount of all the non-alerted transactions. In the example of Group 1, there is a large amount ($10K) associated with alerted transactions relative to the non-alerted transactions ($3K).

FIG. 15A shows a graphical user interface for alert review including a transaction timeline obtained in some embodiments. Each of the components are like their counterparts in FIG. 11 or FIG. 12A unless otherwise described. For simplicity and unlike FIGS. 11 and 12A, this example omits the rules section and tracker section. In this example, there is a transaction timeline 1502 for incoming transactions and a separate transaction timeline 1504 for outgoing transactions. In the timeline view, the unitary representation of transactions is not lost. For example, each square is placed along a time scale that starts when the first transaction happened and ends with the last one. In the event of multiple movements sharing the same timestamp, squares may overlap. This avoids having the chart grow vertically unnecessarily, e.g., becoming hard to read on a smaller screen. When hovering over a square with overlapping transactions, the user can access a tooltip with the number of overlapped elements. If all squares are selected, then they will be highlighted in the transaction history section 1146 and added to the tracker section 1140.

In various embodiments, the timeline has a zoomable time axis. For example, when a user centers over a particular time and scrolls, the timeline will zoom in and out. The zoom direction can correspond to the direction of scroll.

FIG. 15B shows a graphical user interface for alert review including zoomed-in transaction timeline obtained in some embodiments. For simplicity, only the outgoing transactions timeline is shown in this example. Outgoing transactions timeline 1506 is a zoomed-in version of the corresponding timeline 1504 in FIG. 15B. Zooming in can provide more specific information about when a transaction happened. Here, it reveals that the transaction on Mon 14 happened before 3 AM that day.

FIG. 16 shows a graphical user interface for alert review including per-customer behavior over time obtained in some embodiments. Panel 1600 is an example of how per-customer behavior over time can be displayed. In various embodiments, the panel can be a pop-up or drop down displayed within another graphical user interface such as the one shown in FIG. 11. Panel 1600 displays how many periods of distinct behavior were found for that specific counterpart, here Counterpart 2. Displayed in the pop-up are a breakdown of the behaviors by time, as well as a description of each behavior. The time range of various types of behavior is displayed along with a visual representation to show the relative length of time that behavior was observed. For example, Behavior 1 and Behavior 4 have a longer duration than Behavior 2 and Behavior 3. The brevity of Behavior 3 may indicate suspicious activity, for example. This information provides historical context about a particular customer/counterpart, allowing comparisons to be made between their current and past behavior. In particular, if the behavior of the customer/counterpart deviated drastically from the norm when the rules were triggered, the likelihood of the current assessment being suspicious increases. Conversely, if the customer/counterpart frequently triggers rules that are dismissed as false positives, and his behavior is consistent with the expected, then the likelihood of the current assessment being suspicious decreases.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
- receiving transaction data for transactions;
- using a machine learning model to determine embedding representations of the transaction data;
- using one or more automated rules to identify of a subset of the transactions;
- using at least a portion of the embedding representations to automatically cluster the identified subset of the transactions into a plurality of different cluster groups; and
- providing an interactive visual representation of the plurality of different cluster groups, wherein the interactive visual representation includes:
- a user-interactive filtering menu including a user indication of at least one of:
  - a first variable by which to split cards such that a first card displays data for a first value of the first variable and a second card displays data for a second value of the variable; and
  - a second variable by which to group elements within a particular card; and
  - a card for each group of the second variable; and
- a dynamic description of information based at least in part on the user indication.

2. The method of claim 1, further comprising displaying the one or more automated rules used to identify the subset of the transactions.

3. The method of claim 1, wherein the interactive visual representation includes a per-transaction anomaly score.

4. The method of claim 1, wherein the interactive visual representation includes a per-entity behavior over time.

5. The method of claim 1, wherein the interactive visual representation includes an explanation of a determination made by the machine learning model.

6. The method of claim 1, wherein the interactive visual representation includes groups split by at least one of: counterpart, account, money flow, transaction cluster, or time.

7. The method of claim 1, wherein the interactive visual representation includes a plurality of cards, each card representing a unique group and including a unit chart.

8. The method of claim 7, further comprising displaying additional transaction details for a selected unit.

9. The method of claim 7, wherein:
- the interactive visual representation includes a user-controllable definition of coloring of transactions to differentiate between at least one of (i) incoming transactions and outgoing transactions or (ii) rule-triggering transactions and non-rule triggering transactions; and
- a color of a unit corresponds to the defined coloring.

10. The method of claim 7, wherein the interactive visual representation includes an option to turn on an amount gradient to control an opacity or intensity of coloring to correspond to transaction amount and the amount gradient is applied to the plurality of cards.

11. The method of claim 1, wherein the interactive visual representation a user-controllable definition of coloring of transactions to differentiate between incoming transactions and outgoing transactions.

12. The method of claim 1, wherein the interactive visual representation includes an option to turn on an amount gradient to control an opacity or intensity of coloring to correspond to transaction amount.

13. The method of claim 1, wherein the interactive visual representation includes at least one of:
- a counter to show a number of transactions selected, or
- a stacked bar chart showing a total amount corresponding to the selected transactions.

14. The method of claim 1, wherein the interactive visual representation includes a collapsible table showing transaction details.

15. The method of claim 1, wherein the interactive visual representation includes a plurality of unit charts sorted by a user-selectable variable, each unit chart corresponding to a group of transactions.

16. The method of claim 1, wherein the interactive visual representation includes a transaction timeline including a zoomable time axis and transactions overlapping in time are represented by overlapping elements.

17. A system, comprising:
- a processor configured to:
  - receive transaction data for transactions;
  - use a machine learning model to determine embedding representations of the transaction data;
  - use one or more automated rules to identify of a subset of the transactions;
  - use at least a portion of the embedding representations to automatically cluster the identified subset of the transactions into a plurality of different cluster groups; and
  - provide an interactive visual representation of the plurality of different cluster groups, wherein the interactive visual representation includes:
    - a user-interactive filtering menu including a user indication of at least one of:
      - a first variable by which to split cards such that a first card displays data for a first value of the first variable and a second card displays data for a second value of the variable; and
      - a second variable by which to group elements within a particular card; and
      - a card for each group of the second variable; and
    - a dynamic description of information based at least in part on the user indication; and
- a memory coupled to the processor and configured to provide the processor with instructions.

18. A computer program product embodied in a non-transitory computer readable medium and comprising computer instructions for:
- receiving transaction data for transactions;
- using a machine learning model to determine embedding representations of the transaction data;
- using one or more automated rules to identify of a subset of the transactions;
- using at least a portion of the embedding representations to automatically cluster the identified subset of the transactions into a plurality of different cluster groups; and
- providing an interactive visual representation of the plurality of different cluster groups, wherein the interactive visual representation includes:

a user-interactive filtering menu including a user indication of at least one of:

a first variable by which to split cards such that a first card displays data for a first value of the first variable and a second card displays data for a second value of the variable; and a second variable by which to group elements within a particular card; and a card for each group of the second variable; and a dynamic description of information based at least in part on the user indication.

* * * * *